United States Patent
Eskey et al.

(10) Patent No.: US 8,666,977 B2
(45) Date of Patent: Mar. 4, 2014

(54) NEEDS-BASED MAPPING AND PROCESSING ENGINE

(75) Inventors: Eric Eskey, Vancouver, WA (US); Anthony W. Ulwick, Aspen, CO (US)

(73) Assignee: Strategyn Holdings, LLC, San Francisco, CA (US)

( * ) Notice: Subject to any disclaimer, the term of this patent is extended or adjusted under 35 U.S.C. 154(b) by 579 days.

(21) Appl. No.: 12/800,652

(22) Filed: May 18, 2010

(65) Prior Publication Data

US 2011/0145230 A1 Jun. 16, 2011

Related U.S. Application Data

(60) Provisional application No. 61/216,564, filed on May 18, 2009.

(51) Int. Cl.
*G06F 17/30* (2006.01)
(52) U.S. Cl.
USPC ............................. 707/728; 705/7.36
(58) Field of Classification Search
USPC ......... 707/709, 661, 732, 769, 779, 767, 713, 707/747, 730, 797, 104; 705/7.36, 7, 705/107.11
See application file for complete search history.

(56) References Cited

U.S. PATENT DOCUMENTS

| | | | |
|---|---|---|---|
| 4,885,685 A | 12/1989 | Wolfberg et al. | |
| 4,894,773 A | 1/1990 | Lagarias | |
| 4,924,386 A | 5/1990 | Freedman et al. | |
| 4,992,940 A | 2/1991 | Dworkin | |
| 4,996,642 A | 2/1991 | Hey | |
| 5,009,626 A | 4/1991 | Katz | |
| 5,041,972 A | 8/1991 | Frost et al. | |
| 5,111,392 A | 5/1992 | Malin | |
| 5,122,952 A | 6/1992 | Minkus | |
| 5,124,911 A | 6/1992 | Sack | |
| 5,164,897 A | 11/1992 | Clark et al. | |
| 5,182,793 A | 1/1993 | Alexander et al. | |
| 5,200,909 A | 4/1993 | Juergens | |
| 5,251,294 A | 10/1993 | Abelow | |
| 5,267,146 A | 11/1993 | Shimizu et al. | |
| 5,297,054 A | 3/1994 | Kienzle et al. | |
| 5,299,115 A | 3/1994 | Fields et al. | |

(Continued)

FOREIGN PATENT DOCUMENTS

| EP | 210742 A2 | 2/1987 |
|---|---|---|
| FR | 2752934 A1 | 3/1998 |

OTHER PUBLICATIONS

Auchey, Flynn L. et al., "Using PRISM to Quantify Qualitative Data," AACE International Transactions, pp. RI11-RI17, 2006.

(Continued)

*Primary Examiner* — James Trujillo
*Assistant Examiner* — Thong Vu
(74) *Attorney, Agent, or Firm* — Sheppard, Mullin, Richter & Hampton LLP

(57) ABSTRACT

A mechanism is disclosed that dramatically minimizes the time it takes to gather needs, dramatically minimizes the expense it takes to gather those needs, and ensures those statements are formulated in manner that comply with a set of rules designed to ensure the right inputs are used in downstream strategy formulation, marketing, product development, and related company workflows. In addition, the mechanism may or may not minimize the time it takes for a company to acquire the capability to uncover these needs statements.

20 Claims, 12 Drawing Sheets

(56) References Cited

U.S. PATENT DOCUMENTS

| | | | |
|---|---|---|---|
| 5,317,503 A | 5/1994 | Inoue | |
| 5,319,541 A | 6/1994 | Blanchard et al. | |
| 5,351,186 A | 9/1994 | Bullock et al. | |
| 5,416,694 A | 5/1995 | Parrish et al. | |
| 5,432,904 A | 7/1995 | Wong | |
| 5,634,021 A | 5/1997 | Rosenberg et al. | |
| 5,734,890 A | 3/1998 | Case et al. | |
| 5,842,193 A | 11/1998 | Reilly | |
| 5,963,910 A | 10/1999 | Ulwick | |
| 6,085,165 A | 7/2000 | Ulwick | |
| 6,115,691 A | 9/2000 | Ulwick | |
| 6,240,411 B1* | 5/2001 | Thearling | 1/1 |
| 6,526,387 B1 | 2/2003 | Ruffin et al. | |
| 6,708,155 B1 | 3/2004 | Honarvar et al. | |
| 6,961,756 B1 | 11/2005 | Dilsaver et al. | |
| 7,039,654 B1 | 5/2006 | Eder | |
| 7,146,359 B2* | 12/2006 | Castellanos | 1/1 |
| 7,340,409 B1 | 3/2008 | Ulwick | |
| 7,533,035 B1* | 5/2009 | Abend et al. | 705/7.36 |
| 7,664,670 B1 | 2/2010 | Weiss | |
| 7,689,540 B2* | 3/2010 | Chowdhury et al. | 707/713 |
| 7,761,427 B2* | 7/2010 | Martin et al. | 707/661 |
| 7,844,594 B1* | 11/2010 | Holt et al. | 707/709 |
| 7,904,451 B2* | 3/2011 | Cobb et al. | 707/730 |
| 7,970,786 B2* | 6/2011 | Bahrami et al. | 707/779 |
| 8,176,084 B2* | 5/2012 | Chowdhury | 707/797 |
| 8,190,627 B2* | 5/2012 | Platt et al. | 707/767 |
| 8,214,238 B1* | 7/2012 | Fairfield et al. | 705/7.11 |
| 2002/0016727 A1 | 2/2002 | Harrell et al. | |
| 2002/0049621 A1 | 4/2002 | Bruce | |
| 2002/0099582 A1 | 7/2002 | Buckley et al. | |
| 2002/0120459 A1 | 8/2002 | Dick et al. | |
| 2002/0173998 A1 | 11/2002 | Case | |
| 2003/0033040 A1 | 2/2003 | Billings | |
| 2003/0033191 A1 | 2/2003 | Davies et al. | |
| 2003/0033192 A1 | 2/2003 | Zyman et al. | |
| 2003/0036947 A1 | 2/2003 | Smith et al. | |
| 2003/0083914 A1 | 5/2003 | Marvin et al. | |
| 2003/0110067 A1 | 6/2003 | Miller et al. | |
| 2003/0115094 A1 | 6/2003 | Ammerman et al. | |
| 2003/0135399 A1 | 7/2003 | Ahamparam et al. | |
| 2003/0139828 A1 | 7/2003 | Ferguson et al. | |
| 2003/0187707 A1 | 10/2003 | Hack et al. | |
| 2004/0093244 A1 | 5/2004 | Hatcher et al. | |
| 2004/0117234 A1 | 6/2004 | Lindsay-Scott et al. | |
| 2004/0143470 A1 | 7/2004 | Myrick et al. | |
| 2004/0193476 A1 | 9/2004 | Aerdts | |
| 2004/0204980 A1 | 10/2004 | Swedberg et al. | |
| 2004/0230397 A1 | 11/2004 | Chadwick | |
| 2004/0230464 A1 | 11/2004 | Bliss et al. | |
| 2004/0236621 A1 | 11/2004 | Eder | |
| 2005/0026119 A1 | 2/2005 | Ellis et al. | |
| 2005/0096950 A1 | 5/2005 | Caplan et al. | |
| 2005/0114829 A1 | 5/2005 | Robin et al. | |
| 2005/0228824 A1* | 10/2005 | Gattuso et al. | 707/104.1 |
| 2005/0240511 A1 | 10/2005 | Chadwick et al. | |
| 2006/0080326 A1 | 4/2006 | Akbay et al. | |
| 2006/0085255 A1 | 4/2006 | Hastings et al. | |
| 2006/0149764 A1 | 7/2006 | Burchfield et al. | |
| 2006/0200423 A1 | 9/2006 | Powell | |
| 2006/0206374 A1 | 9/2006 | Asthana et al. | |
| 2006/0277156 A1 | 12/2006 | Merican | |
| 2006/0287937 A1 | 12/2006 | Flinn et al. | |
| 2007/0038501 A1 | 2/2007 | Lee et al. | |
| 2007/0038627 A1 | 2/2007 | Cohn et al. | |
| 2007/0050198 A1 | 3/2007 | Ledford et al. | |
| 2007/0078692 A1 | 4/2007 | Vyas | |
| 2007/0083385 A1 | 4/2007 | Patterson et al. | |
| 2007/0083421 A1 | 4/2007 | McNair et al. | |
| 2007/0106520 A1 | 5/2007 | Akkiraju et al. | |
| 2007/0129981 A1 | 6/2007 | Jang et al. | |
| 2007/0156382 A1 | 7/2007 | Graham et al. | |
| 2007/0162316 A1 | 7/2007 | Kratschmer et al. | |
| 2007/0179833 A1* | 8/2007 | Moorthy et al. | 705/10 |
| 2007/0282666 A1 | 12/2007 | Afeyan et al. | |
| 2007/0282667 A1 | 12/2007 | Cereghini et al. | |
| 2008/0021844 A1 | 1/2008 | Sanwal et al. | |
| 2008/0114608 A1 | 5/2008 | Bastien | |
| 2008/0114628 A1 | 5/2008 | Johnson et al. | |
| 2008/0133316 A1* | 6/2008 | Sarkar | 705/10 |
| 2008/0167936 A1 | 7/2008 | Kapoor | |
| 2008/0205692 A1 | 8/2008 | Hinkle et al. | |
| 2008/0208648 A1 | 8/2008 | Linder et al. | |
| 2008/0249825 A1 | 10/2008 | Kunjur et al. | |
| 2008/0256069 A1* | 10/2008 | Eder | 707/5 |
| 2008/0294534 A1 | 11/2008 | Brown et al. | |
| 2008/0312980 A1 | 12/2008 | Boulineau et al. | |
| 2008/0313596 A1 | 12/2008 | Kreamer et al. | |
| 2008/0319811 A1 | 12/2008 | Casey | |
| 2008/0319958 A1* | 12/2008 | Bhattacharya et al. | 707/4 |
| 2009/0018891 A1 | 1/2009 | Eder | |
| 2009/0070160 A1 | 3/2009 | Kasravi et al. | |
| 2009/0112686 A1 | 4/2009 | Sheehan et al. | |
| 2009/0138322 A1 | 5/2009 | Joyner et al. | |
| 2009/0144127 A1 | 6/2009 | Smith | |
| 2009/0157569 A1 | 6/2009 | Henby et al. | |
| 2009/0259521 A1* | 10/2009 | Yitts | 705/10 |
| 2010/0070348 A1 | 3/2010 | Nag | |
| 2010/0125475 A1* | 5/2010 | Twyman | 705/7 |
| 2010/0125566 A1 | 5/2010 | Gibbs et al. | |
| 2010/0145951 A1* | 6/2010 | Van Coeverden De Groot et al. | 707/747 |
| 2010/0179951 A1* | 7/2010 | McPhail | 707/740 |
| 2011/0029514 A1* | 2/2011 | Kerschberg et al. | 707/732 |
| 2011/0040750 A1* | 2/2011 | Safra et al. | 707/723 |
| 2011/0087698 A1* | 4/2011 | Iguchi | 707/769 |
| 2011/0161054 A1 | 6/2011 | Woolf et al. | |

OTHER PUBLICATIONS

Campion, Michael A. et al., "Neglected Questions in Job Design: How People Design Jobs, Task-Job Predictabillity, and Influence of Training," Journal of Business and Psychology, vol. 6, No. 2, pp. 169-191, Winter 1991.

Kaeli, James K., "A Company-Wide Perspective to Identify, Evaluate and Rank the Potential for CIM (Computer Integrated Manufacturing)," Industrial Engineering, vol. 22, No. 7, pp. 23-26, Jul. 1990.

Notice of Allowance mailed Apr. 19, 2012 in U.S. Appl. No. 12/476,160, filed Jun. 1, 2009.

Non-Final Office Action mailed May 10, 2012 in U.S. Appl. No. 12/563,969, filed Sep. 21, 2009.

Final Office Action mailed Jul. 2, 2012 in U.S. Appl. No. 12/592,715, filed Nov. 30, 2009.

GartnerGroup Executive Services, "Executive Market Analysis Program, Today's Market Program demands Better Analysis", pp. 11-36 (first provided to clients in Nov. 1993).

Saaty, "Decision Making for Leaders", pp. 1-33, 1988.

Vincze, "Expert Choice", pp. 10-12, Mar. 1990.

Von Hippel, "Democratizing Innovation", MIT Press, Apr. 2005.

Chesbrough, "Open Innovation, The New Imperative for Creating and Profiting from Technology", Harvard Business School Press, 2003.

Harrison et al., "Edison in the Boardroom. Moving Beyond Intellectual Capital to I-Stuff", John Wiley & Sons, Inc., 2006.

Davis et al., "Edison in the Boardroom, How Leading Companies Realize Value from Their Intellectual Assets", John Wiley & Sons, 2001.

Fuelling, "Manufacturing, Selling and Accounting: Patenting Business Methods", 76 Journal of the Patent and Trademark Office Society, Jul. 1994, pp. 471-507.

Ulwick, "Turn Customer Input into Innovation", Harvard Business Review, Jan. 2002, pp. 5-11.

Lyman et al., "Deployment Normalization", International TechneGroup Incorporation, 1990, pp. 1-7.

Ulwick, "The Intellectual Revolution, Applying Advanced Technology to Strategy Formulation, Planning and Decision Marking", Strategyn, Inc., Manuscript Version 030698, 1997, pp. 1-166.

Strategyn, Inc., "CD-MAP®, An Advanced Technology for Strategy Formulation", 1998, pp. 1-37.

(56) References Cited

OTHER PUBLICATIONS

Strategyn, Inc., "Sample Project Reports, Presenting the Results of a CD-MAP®, XYZ Company, CD-MAP® Project Final Report, Formulating a Strategy Improve the Product Development Process", pp. 1-26 and "XYZ Company, CD-MAP® Project Final Report, Evaluating the Attractiveness of Alternative Market Segments", 1998, pp. 1-23.
Co-pending U.S. Appl. No. 12/476,160, filed Jun. 1, 2009.
Co-pending U.S. Appl. No. 12/563,969, filed Sep. 21, 2009.
Co-pending U.S. Appl. No. 08/763,668, filed Dec. 11, 1996.
Notice of Allowance Mailed Mar. 1, 1999 in Co-pending U.S. Appl. No. 08/763,668, filed Dec. 11, 1996.
Non-Final Office Action Mailed Sep. 16, 1998 in Co-pending U.S. Appl. No. 08/763,668, filed Dec. 11, 1996.
Co-pending U.S. Appl. No. 08/716,948, filed Sep. 20, 1996.
Notice of Allowance Mailed Mar. 1, 1999 in Co-pending U.S. Appl. No. 08/716,948, filed Sep. 20, 1996.
Non-Final Office Action Mailed Sep. 17, 1998 in Co-pending U.S. Appl. No. 08/716,948, filed Sep. 20, 1996.
Co-pending U.S. Appl. No. 09/385,661, filed Aug. 27, 1999.
Notice of Allowance Mailed Mar. 27, 2000 in Co-pending U.S. Appl. No. 09/385,661, filed Aug. 27, 1999.
Co-pending U.S. Appl. No. 09/652,576, filed Aug. 31, 2000.
Notice of Allowance Mailed Oct. 11, 2007 in Co-pending U.S. Appl. No. 09/652,576, filed Aug. 31, 2000.
Non-Final Office Action Mailed Mar. 14, 2006 in Co-pending U.S. Appl. No. 09/652,576, filed Aug. 31, 2000.
Final Office Action Mailed Jul. 27, 2006 in Co-pending U.S. Appl. No. 09/652,576, filed Aug. 31, 2000.
Advisory Action Mailed Nov. 30, 2005 in Co-pending U.S. Appl. No. 09/652,576, filed Aug. 31, 2000.
Non-Final Office Action Mailed Jul. 26, 2004 in Co-pending U.S. Appl. No. 09/652,576, filed Aug. 31, 2000.
Co-pending U.S. Appl. No. 10/235,285, filed Sep. 5, 2002.
Final Office Action Mailed May 28, 2009 in Co-pending U.S. Appl. No. 10/235,285, filed Sep. 5, 2002.
Non-Final Office Action Mailed Apr. 4, 2008 in Co-pending U.S. Appl. No. 10/235,285, filed Sep. 5, 2002.
Co-pending U.S. Appl. No. 12/253,433, filed Oct. 17, 2008.
Co-pending U.S. Appl. No. 13/319,066, filed Nov. 4, 2011.
Office Action mailed Oct. 7, 2011 from U.S. Appl. No. 12/253,433, filed Oct. 17, 2008.
Office Action mailed Nov. 16, 2011 from U.S. Appl. No. 12/476,160, filed Jun. 1, 2009.
Office Action mailed Dec. 20, 2011 from U.S. Appl. No. 12/592,715, filed Nov. 30, 2009.
Co-pending U.S. Appl. No. 13/020,546, filed Feb. 3, 2011.
Co-pending U.S. Appl. No. 12/592,715, filed Nov. 30, 2009.
Search Report and Written Opinion mailed Sep. 28, 2010 from International Serial No. PCT/US2010/026858 filed Mar. 10, 2010.
European Patent Application No. 10751374.9, Search Report mailed May 2, 2013.
Non-Final Office Action mailed Sep. 28, 2012 in U.S. Appl. No. 13/020,546, filed Feb. 3, 2011.
Non-Final Office Action mailed Nov. 6, 2012 in U.S. Appl. No. 13/533,689, filed Jun. 26, 2012.

\* cited by examiner

NEEDS-BASED MAPPING AND PROCESSING ENGINE

BACKGROUND

Today's modern business enterprises require and make use of sophisticated information systems to acquire vital insights into the performance or prospective future performance of their business relative to goals, market metrics, competitive information, and the like. This class of information products is known in the field today as Management Information Systems (MIS) or Business Intelligence (BI) tools. In addition businesses seek better ways to identify the right strategies and new ideas that can help them grow, and information solutions supporting these objectives are often referred to as Collaboration Technologies, and Innovation Management Systems. Collectively these information systems fall under the general category of Enterprise and Marketing Intelligence Systems and represent a critical part of today's business software and information systems marketplace.

While data management and reporting technologies have advanced to become adept at efficiently retrieving information stored in these systems and generating reports, the problem that plagues all these systems is the lack of a unifying information framework, or ontology, that provides a stable and fundamental frame of reference that is absolute and consistently meaningful across all domains for gleaning business insights or for facilitating value creation. The lack of an ontology means that evaluations on the information gathered are highly subjective and dependent on interpretation, and that each information domain tends to exist as an island where local rules prevail, rather than as a part of an integrated whole. The problems this creates for business are innumerable; consequently MIS and BI systems today, while enabling better informed decisions, have failed to deliver on their promise of transforming management decision making. For example, these systems can easily track the sales results and underlying demographics for a particular market, but utterly fail at providing any empirically defensible prediction, save extrapolation of past results, around whether these results are sustainable or what impact a new idea will have. More generally, the lack of a valid unifying and quantifiable frame of reference for business insight and intelligence means that compromises are made in making decisions and projections into future business impacts are largely guesswork. This problem has always existed in business information analysis and decision making, and it is a root cause of many mistaken beliefs and failures in business information technology initiatives.

An example of market modeling created by Anthony Ulwick and called Outcome Driven Innovation (ODI) creates an empirically valid estimator of market demand by holistically identifying the Jobs that customers and key participants in the consumption chain are trying to get done in a particular market and then collecting quantitative data on Importance and satisfaction levels associated with all of these jobs and with the desired outcomes associated with a specific core job of interest. This data is then analyzed to identify needs that are underserved (representing opportunities for new products and services) and those that are over-served (representing areas that are ready for being disrupted). A proprietary index called the opportunity score is used to determine the strength of the underlying market conditions driving these findings, and this score has been shown to be a valid empirical estimator of customer demand/sentiment and hence the consequential business value of fulfilling the market needs appropriately. The practice of researching and analyzing markets in this fashion is what is referred to as the ODI methodology.

The ODI methodology possesses four critical attributes that collectively make it uniquely valuable for business analysis. First, the use of the Jobs framework enables one to completely describe any interaction a customer or key influencer may have with current or yet-to-be designed products and services and measure these in a meaningful unit of analysis. This is important to obtaining insights and making informed decisions on questions where the objects of interest are parts of interconnected systems like in virtually all business matters. Today's MIS, BI, and Innovation Management systems lack this unifying framework and so do little to facilitate meaningful comparisons and analyses within and across the inherently disparate information domains of the system (e.g. competitive information, customer market information, product management information, R&D, etc.). Second, the measurement system used by the methodology provides direct quantitative measurement of the fundamental driver of business outcomes—customer demand, and this measurement system is both reproducible and repeatable. Third, the actual measurements taken are internally consistent; that is they report on the same dimensions of importance and satisfaction irrespective of whether jobs or outcomes are being studied and whether the job of interest is a functional job, an emotional job, or a related job. This therefore means that the methodology enables disparate variables of successful business endeavors, such as emotional factors, functional factors, and performance factors, to be compared directly to one another for prioritization without transformation. And fourth, the numerical data collected are normalized by an indexing method to have the same market meaning regardless of the factor being studied and are scaled in a manner that directly reflects the significance of the metric in market terms. This ensures that comparisons across factors are not just qualitatively valid but also quantitatively correct and easily extrapolated to real business impacts. For these reasons the foundation of ODI presents an information platform for business analysis that is fundamentally superior to all constructs that have preceded it.

SUMMARY

An effective strategy should inform a company on three fronts. First, it should identify attractive markets for value creation so that only worthwhile markets are pursued. Second, it should determine what unmet needs to target and what product portfolio is needed to gain the company a unique and valued competitive position. Third, it should dictate what operational capabilities and business model to employ to maximize revenue and minimize cost. With these insights, a company can pursue attractive markets with products and services that create customer value and company profitability. At the foundation is the recognition that when it comes to strategy, customer needs are the basic units of competitive advantage.

Even though there is broad agreement that innovation is the key to growth and that understanding customer needs is the key to innovation, less than 5% of companies agree within their company on what a customer need is. A company will be unable to confidently uncover customer needs, determine which are unmet, and systematically create products that address them if they cannot agree on what a customer need is to begin with—and this is a root cause of many failures in the strategy formulation process.

To make a customer need useful to the entire company and to strategy formulation efforts, it should possess six characteristics:

1. The statement should reflect the customer's definition of value;
2. The statement should have universal acceptance;
3. The statement should be relevant now and in the future;
4. The statement should prompt a course of action;
5. The statement's meaning should not be open to interpretation;
6. The statement itself should not confound the way it or other statements are prioritized.

The Outcome-Driven Innovation Methodology defines a set of rules for creating need statements. Still, companies have been misled to believe that anyone can go talk to customers and get needed inputs. Companies have instituted programs where they let those not trained to gather customer needs to talk to customers. This is a critical part of the problem. Gathering the right inputs requires years of skill and practice. Successful practitioners have to be very process-oriented, understand systems, be able to deconstruct jobs into process steps, be metric-oriented, and be able to listen for metrics.

Companies have sought to solve these problems by training practitioners who possess the desired aptitudes. Still, the time it takes a company to build a competency to gather customer needs can take a many years-long effort. Alternatively, companies that can afford to will hire previously trained practitioners or consultants to gather needs and execute market studies. These resources, while capable, are expensive—much too expensive for all but the largest of the Fortunate 1000. Regardless of the currently-available methods employed, the time it takes for a company to gather all the needs in all the markets in which it operates or desires to operate can be a many-month and in some cases a many-year effort. The expense to do so can easily be many millions of dollars. And the quick pace at which markets change forces companies to make compromises and only gather needs in their most critical markets.

Those companies that overcome these barriers still face challenges. When reviewed by experts, needs statements gathered by these companies often refer to solutions, include words that cause ambiguity and confusion, are vague, do not follow the rules of proper grammar, use different terms to describe the same item, have an inconsistent structure or format from statement to statement, and many more.

It is thus desirable to devise a mechanism that dramatically minimizes the time it takes to gather needs, dramatically minimizes the expense it takes to gather those needs, and ensures those statements are formulated in manner that comply with a set of rules designed to ensure the right inputs are used in downstream strategy formulation, marketing, product development, and related company workflows. It is also desirable to devise a mechanism that minimize the time it takes for a company to acquire the capability to uncover these needs statements.

The mechanism establishes a relationship between a formulated need and the source material from which it was derived. This enables the user to use "verbatims" or "the literal voice of the customer" to provide further context and explanation related to a formulated need statement. It also aids in the verification that the formulated need statements accurately and precisely reflect the needs expressed in the source text.

In addition to gathering needs, the mechanism gathers a list of solutions and the technical, customer, and contextual reasons why a need may be underserved, overserved, or appropriately served. This information enables the user to understand the causal reasons why a need may be unmet or not—a critical input to the strategy formulation process.

In addition, the mechanism looks to existing primary and secondary research from which data necessary to formulate a strategy is needed, including how many people execute a certain job, how frequently they execute it, how satisfied they are with their ability to get that job done, how much money they spend today piecing together solutions to get that job done, how much time they spend getting that job done, how much they are willing to spend to get that job done perfectly, and the longevity of the job—the number of years that job will likely be informed.

DETAILED DESCRIPTION

Figure 1:
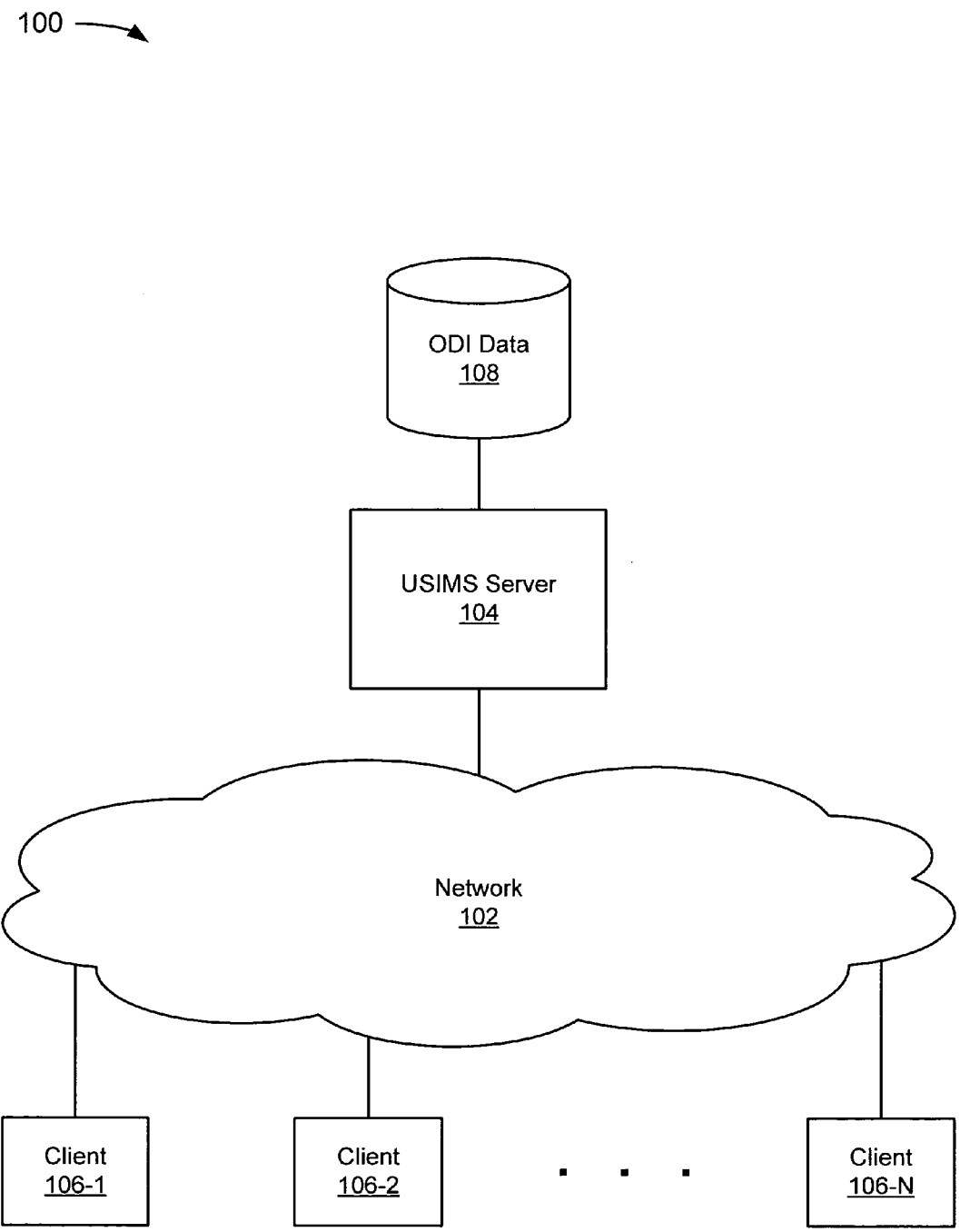
FIG. 1 depicts an example of a system including a universal strategy and innovation management system (USIMS) server.

FIG. 1 depicts an example of a system 100 including a universal strategy and innovation management system (USIMS) server. In the example of FIG. 1, the system 100 includes a network 102, a USIMS server 104, clients 106-1 to 106-N (referred to collectively as the clients 106), and an Outcome Driven Innovation (ODI) data repository 108.

In the example of FIG. 1, the network 102 can include a networked system that includes several computer systems coupled together, such as the Internet. The term "Internet" as used herein refers to a network of networks that uses certain protocols, such as the TCP/IP protocol, and possibly other protocols such as the hypertext transfer protocol (HTTP) for hypertext markup language (HTML) documents that make up the World Wide Web (the web). Content is often provided by content servers, which are referred to as being "on" the Internet. A web server, which is one type of content server, is typically at least one computer system which operates as a server computer system and is configured to operate with the protocols of the World Wide Web and is coupled to the Internet. The physical connections of the Internet and the protocols and communication procedures of the Internet and the web are well known to those of skill in the relevant art. For illustrative purposes, it is assumed the network 102 broadly includes, as understood from relevant context, anything from a minimalist coupling of the components illustrated in the example of FIG. 1, to every component of the Internet and networks coupled to the Internet.

A computer system, as used in this paper, is intended to be construed broadly. In general, a computer system will include a processor, memory, non-volatile storage, and an interface. A typical computer system will usually include at least a processor, memory, and a device (e.g., a bus) coupling the memory to the processor.

The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The term "computer-readable storage medium" is intended to include physical media, such as memory.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable storage medium." A processor is considered to be "configured to execute a program" when at least one value associated with the program is stored in a register readable by the processor.

The bus can also couple the processor to the interface. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device.

In one example of operation, the computer system can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs to configure the general purpose systems in a specific manner in accordance with the teachings herein, or it may prove convenient to construct specialized apparatus to perform the methods of some embodiments. The required structure for a variety of these systems will appear from the description below. In addition, the techniques are not described with reference to any particular programming language, and various embodiments may thus be implemented using a variety of programming languages.

Referring once again to the example of FIG. 1, in the example of FIG. 1, the USIMS server 104 is coupled to the network 102. The USIMS server 104 can be implemented on a known or convenient computer system. The USIMS server 104 is intended to illustrate one server that has the novel functionality, but there could be practically any number of USIMS servers coupled to the network 102 that meet this criterion. Moreover, partial functionality might be provided by a first server and partial functionality might be provided by a second server, where together the first and second server provide the full functionality.

Functionality of the USIMS server 104 can be carried out by one or more engines. As used in this paper, an engine includes a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware. Examples of USIMS functionality are described later.

In the example of FIG. 1, the clients 106 are coupled to the network 102. The clients 106 can be implemented on one or more known or convenient computer systems. The clients 106 use the USIMS functionality provided by the USIMS server 104. Depending upon the implementation and/or preferences, the clients 106 can also carry out USIMS functionality. Depending upon the implementation and/or preferences, in addition to or instead of using the USIMS functionality provided by the USIMS server 104, the clients 106 can provide ODI or other useful data to the USIMS server 104.

In the example of FIG. 1, the ODI data repository 108 is coupled to the USIMS server 104. The ODI data repository 108 has data that is useful to the USIMS server 104 for providing the USIMS functionality. The ODI data repository 108, and other repositories described in this paper, can be implemented, for example, as software embodied in a physical computer-readable medium on a general- or specific-purpose machine, in firmware, in hardware, in a combination thereof, or in any applicable known or convenient device or system. This and other repositories described in this paper are intended, if applicable, to include any organization of data, including tables, comma-separated values (CSV) files, traditional databases (e.g., SQL), or other known or convenient organizational formats.

In an example of a system where the ODI data repository 108 is implemented as a database, a database management system (DBMS) can be used to manage the ODI data repository 108. In such a case, the DBMS may be thought of as part of the ODI data repository 108 or as part of the USIMS server 104, or as a separate functional unit (not shown). A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Alpha Five, DataEase, Oracle database, IBM DB2, Adaptive Server Enterprise, FileMaker, Firebird, Ingres, Informix, Mark Logic, Microsoft Access, InterSystems Cache, Microsoft SQL Server, Microsoft Visual FoxPro, MonetDB, MySQL, PostgreSQL, Progress, SQLite, Teradata, CSQL, OpenLink Virtuoso, Daffodil DB, and OpenOffice.org Base, to name several.

Database servers can store databases, as well as the DBMS and related engines. Any of the repositories described in this paper could presumably be implemented as database servers. It should be noted that there are two logical views of data in a database, the logical (external) view and the physical (internal) view. In this paper, the logical view is generally assumed to be data found in a report, while the physical view is the data stored in a physical storage medium and available to a specifically programmed processor. With most DBMS implementations, there is one physical view and an almost unlimited number of logical views for the same data.

A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. An optimal structure may vary depending upon application requirements (e.g., speed, reliability, maintainability, scalability, and cost). One of the more common models in use today is the ad hoc model embedded in SQL. Data structures can include fields, records, files, objects, and any other applicable known or convenient structures for storing data. A database query language can enable users to query databases, and can include report writers and security mechanisms to prevent unauthorized access. A database transaction mechanism ideally ensures data integrity, even during concurrent user accesses, with fault tolerance. DBMSs can also include a metadata repository; metadata is data that describes other data.

Particularly where the USIMS server 104 functions as a business process management (BPM) server, it may be desirable to enable the USIMS server 104 to have access to mail data. BPM, as used in this paper, is a technique intended to align organizations with the needs of clients by continuously improving processes. BPM is an advantageous implementation because it tends to promote business efficacy while striving for innovation and integration with technology.

It should be noted that business process modeling and business process management are not the same, and, confusingly, share the same acronym. In this paper, business process management is given the acronym BPM, but business process modeling is not given an acronym. Business process modeling is often, though not necessarily, used in BPM. Business process modeling is a way of representing processes in systems or software. The models are typically used as tools to improve process efficiency and quality, and can use Business Process Modeling Notation (BPMN) or some other notation to model business processes.

A business process, as used in this paper, is a collection of related, structured activities or tasks that produce a service or product for a particular client. Business processes can be categorized as management processes, operational processes, and supporting processes. Management processes govern the operation of a system, and include by way of example but not limitation corporate governance, strategic management, etc. Operational processes comprise the core business processes for a company, and include by way of example but not limitation, purchasing, manufacturing, marketing, and sales. Supporting processes support the core processes and include, by way of example but not limitation, accounting, recruiting, technical support, etc.

A business process can include multiple sub-processes, which have their own attributes, but also contribute to achieving the goal of the super-process. The analysis of business processes typically includes the mapping of processes and sub-processes down to activity level. A business process is sometimes intended to mean integrating application software tasks, but this is narrower than the broader meaning that is frequently ascribed to the term in the relevant art, and as intended in this paper. Although the initial focus of BPM may have been on the automation of mechanistic business processes, it has since been extended to integrate human-driven processes in which human interaction takes place in series or parallel with the mechanistic processes.

The USIMS server 104 can, of course, be coupled to other external applications (not shown) either locally or through the network 102 in a known or convenient manner. The USIMS server 104 can also be coupled to other external data repositories.

Figure 2:
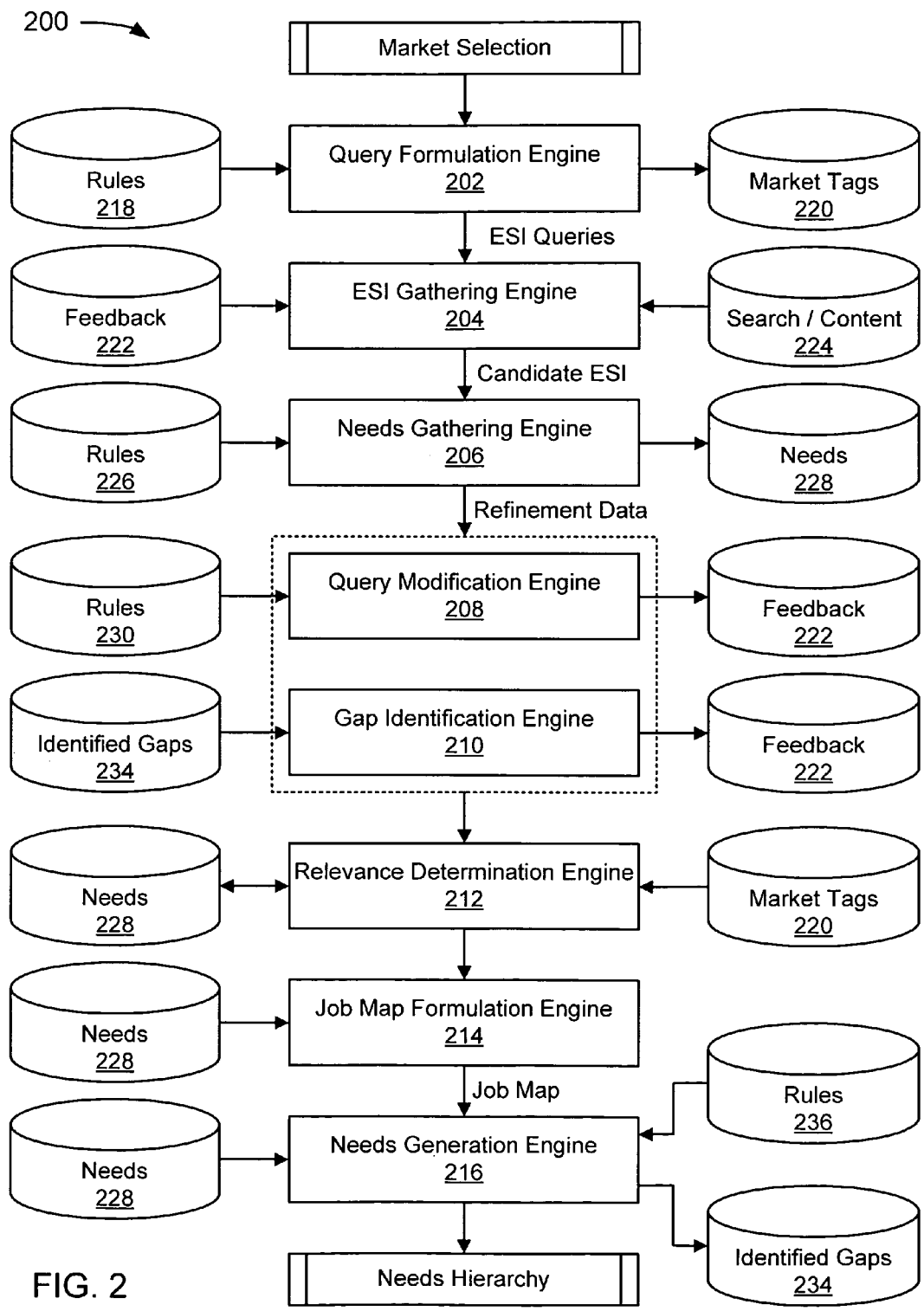
FIG. 2 depicts an example of a USIMS system.

FIG. 2 depicts a conceptual diagram of a USIMS system 200. In the example of FIG. 2, the system 200 includes a query formulation engine 202, an electronically stored information (ESI) gathering engine 204, a needs gathering engine 206, a query modification engine 208, a gap identification engine 210, a relevance determination engine 212, a job map formulation engine 214, and a needs generation engine 216. For illustrative simplicity, the engines are described in order and arrows depict the flow of engine functionality from one to the next. It should be noted that, depending upon the implementation, configuration, and/or embodiment, engines can operate in parallel and operations can jump around (forward or backward) despite the arrows that show, for illustrative simplicity, a flow from the query formulation engine 202 to the needs generation engine 216 in order.

The system 200 can provide a metadata environment to capture tags and links to other data stored in the system 200, and an ETL designed to extract information from ERP or other enterprise data sources, transform, and load the data into a structured repository. The structured repository uses ODI data (Jobs and Outcomes) as a reference model that organizes the disparate data.

In the example of FIG. 2, the query formulation engine 202 is provided a market data structure selected and/or derived from a market selection process. The query formulation engine 202 can tag the market data structure to improve the quality of formulated ESI queries. A market is defined as a group of people (demographic) and the core job or jobs they are trying to get done. This is in stark contrast to the way companies typically define a market—usually in terms of the technology, product, or solution customers use to get the job done. The outcome-driven definition is need oriented rather than solution oriented. A market is defined in this manner so that the entire job the customer is trying to get done can be studied and so that customer needs and potential innovation opportunities can more effectively be revealed.

To avoid confounding the way needs related to a market are collected, a market is defined in a specific format: "[job executor]+the [job] the job executor is trying to get done" where the job is defined as: "[verb]+[object of the verb]+ [contextual clarifier]+[examples of the object]". For example, a strategist may define a market as, "Physicians who treat arteriosclerosis in men with a stent, e.g., abnormal thickening of the arterial walls, abnormal hardening of the arterial walls, etc." Thus, the market can be represented as a data structure having the relevant components. A market for emotional jobs can be defined with specificity, as well (e.g., "feel . . . /avoid feeling . . . ; be perceived . . . /void being perceived . . . ).

The query formulation engine 202 is coupled to at least two data stores, a rules data store 218 and a market tags data store 220. An ESI queries data store (not shown) could store ESI queries, but in the example of FIG. 2, the ESI queries are treated as data that is passed from the query formulation engine 202 to the ESI gathering engine 204, so a representation of the ESI queries in a data store is omitted for illustrative simplicity. When the query formulation engine 202 tags the market data structure, the market tags can be stored in the market tags data store 220 for later use, such as in assessing relevance of documents returned by a search. The rules data store 218 can include a data store of synonyms, grammar rules, semantics, and/or rules for forming queries. Some queries are more effective in finding documents relevant and which refer to needs related to the market than other queries. These rules, including predetermined queries, can be taken as inputs to the query formulation engine 202 to generate more effective ESI queries. An output of the query formulation engine 202 is ESI queries that are designed to address needs.

Figure 3:
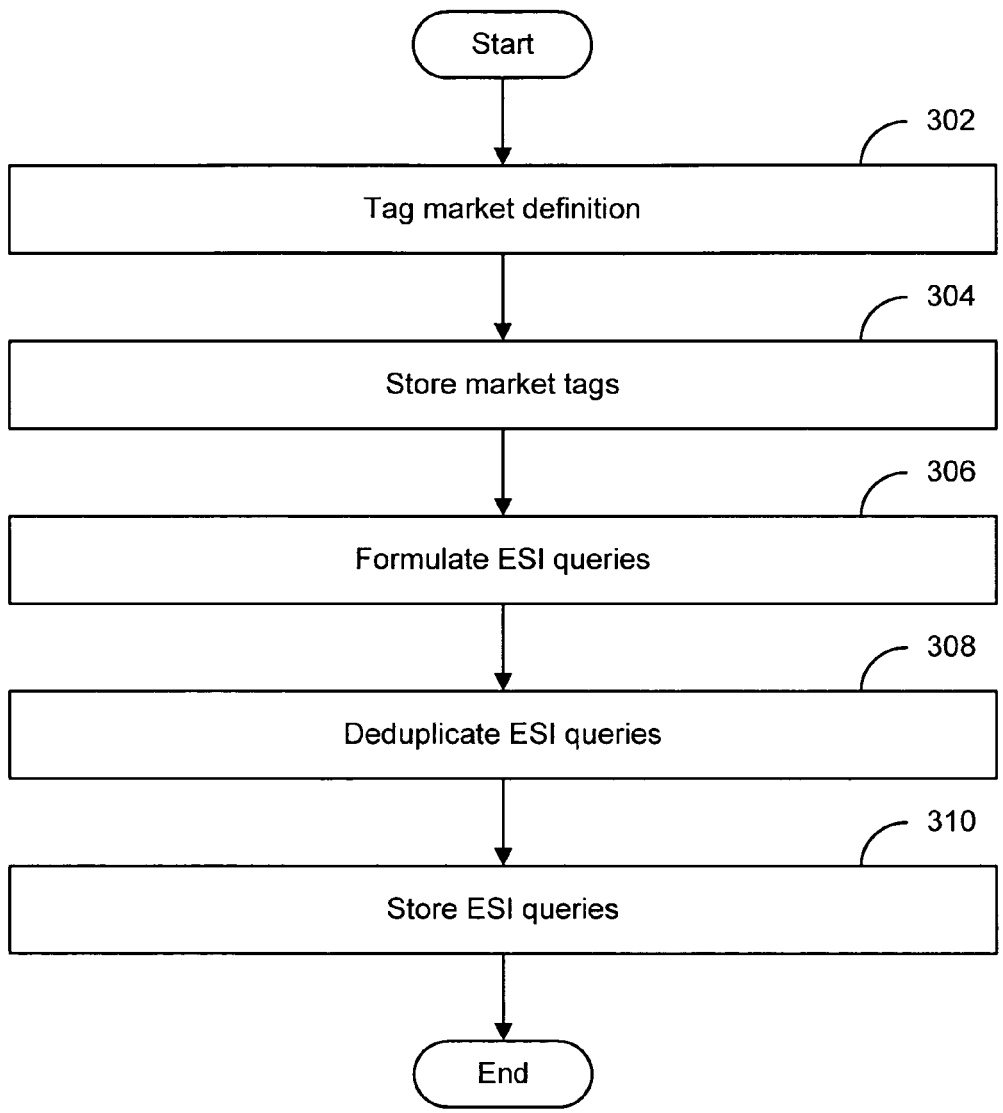
FIG. 3 depicts a flowchart of an example of a method for formulating electronically stored information (ESI) queries.

FIG. 3 depicts a flowchart 300 of an example of a method for formulating ESI queries. This method and other methods are depicted as serially arranged modules. However, modules of the methods may be reordered, or arranged for parallel execution as appropriate. In the example of FIG. 3, the flowchart 300 starts at module 302 where a market definition is tagged. A query formulation engine can analyze the definition of a market to locate and tag its component elements. These elements are used by a USIMS to formulate queries to locate ESI that are responsive to the market, to gather needs, etc. An example of how a market can be tagged is illustrated here with the sentence: "Physicians who treat arteriosclerosis in men with a stent, e.g., abnormal thickening of the arterial walls, abnormal hardening of the arterial walls, etc." The sentence can be tagged as: "Physicians (Demographic [D0]) who treat (Verb [V0]) arteriosclerosis (Object [O0]) in men (Contextual clarifier (solution) [S0]) with a stent (Contextual clarifier [C0]), e.g., abnormal thickening of the arterial walls, abnormal hardening of the arterial walls, etc. (Examples [E0]). Physicians could also be tagged as a group of job executors. However, it is not necessarily the case that a demographic equals a group of job executors. For example, being an adult (demographic) does not necessarily make the adult part of the market of those getting the job of "teach children life lessons." For this example, the job executor group could more appropriately be labeled "parents" or "teachers of young children."

In the example of FIG. 3, the flowchart 300 continues to module 304 where market tags are stored. Stored market tags can be used by other engines, such as a relevance determination engine, of the USIMS to assess the relevance of documents returned by a search, formulate queries to gather needs, etc.

In the example of FIG. 3, the flowchart 300 continues to module 306 where ESI queries are formulated. A query formulation engine will build queries to find responsive ESI using various combinations of tags, synonymy and grammatical variations of the tags, semantics, semantic rules, and general query formulation rules. For example, the query formulation engine can take D0 as "physicians" and use synonyms to generate D1 as "doctor", D2 as "surgeon", etc. Using grammatical rules, the engine can take O0 as "arteriosclerosis" and generate O1 as "peripheral vascular disease", O2 as "PVD", etc. The engine can apply a combination of synonyms and grammatical rules to take V0 as "treat" and generate V1 as "cure", V2 as "curing", etc. In this way, n queries can be generated as illustrated by way of example but not limitation in TABLE 1.

TABLE 1

| Query | Data Structure |
| --- | --- |
| Q0 | D0 + V0 + O0 |
| Q1 | D0 + V0 + O0 + C0 |
| Q2 | D0 + V0 + O0 + C0 + S0 |
| Q3 | D0 + V0 + O0 + C0 + S0 + E0 |
| ... | ... |
| Qn | Dn + Vn + On + Cn + Sn + En |

The application of semantic rules and predefined queries can be applied to create an even larger family of queries that increases the likelihood that as many responsive documents as is practical are considered.

In the example of FIG. 3, the flowchart 300 continues to module 308 where ESI queries are deduplicated. This can be as simple as detecting identical ESI queries or ESI queries that are permutations of one another. It could also include more sophisticated techniques to ensure that the number of ESI queries is efficient, though this is not required.

In the example of FIG. 3, the flowchart 300 continues to module 310 where ESI queries are stored. A search engine, whether part of the USIMS or a second-party search engine, can use the stored ESI queries to locate candidate ESI throughout the World Wide Web, Internet, corporate databases, strategist-provided ESI, and the like.

Referring once again to the example of FIG. 2, the ESI gathering engine 204 uses ESI queries from the query formulation engine 202 (and/or from an ESI queries data store) to extract relevant ESI from various sources. The ESI gathering engine 204 can receive data from a feedback data store 222 that includes, by way of example but not limitation, ESI queries derived from refining searches after at least one iteration of searching using the ESI queries from the query formulation engine 202, documents created as a result of gathering needs directly from customers to fill gaps in knowledge that were not discovered or not discoverable initially, strategist-provided ESI, to name a few. ESI queries are received from the ESI query formulation engine 202 and feedback from other modules to locate candidate ESI throughout the World Wide Web, accessible corporate databases, strategist-provided ESI, etc. (a search/content data store 224).

Common data source formats are relational databases and flat files, but can include any applicable known or convenient structure, such as, by way of example but not limitation, Information Management System (MIS), Virtual Storage Access Method (VSAM), Indexed Sequential Access Method (ISAM), web spidering, screen scraping, etc. Extraction can include parsing the extracted data, resulting in a check if the data meets an expected pattern or structure.

Figure 4:
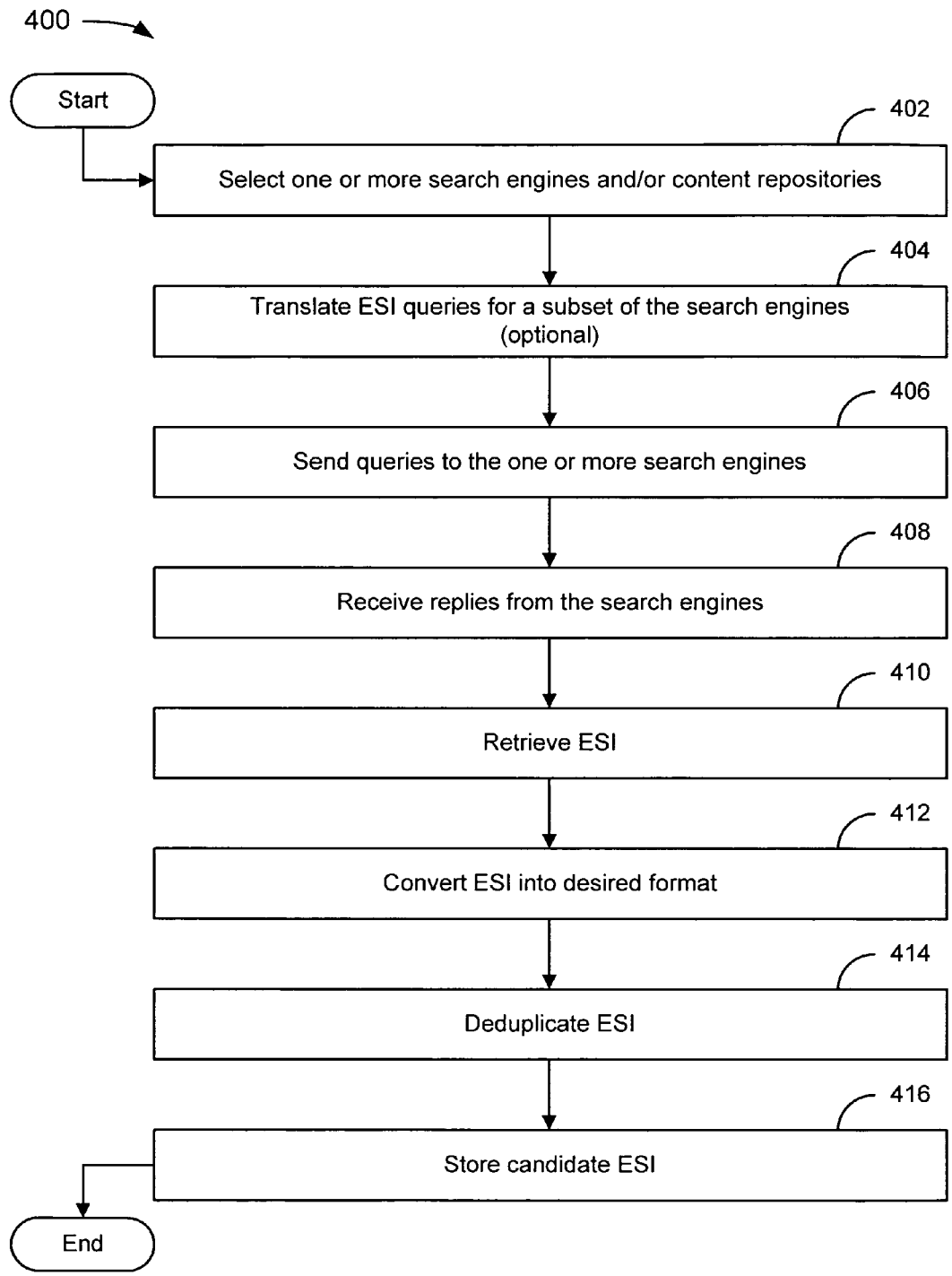
FIG. 4 depicts a flowchart of an example of a method for ESI gathering.

FIG. 4 depicts a flowchart 400 of an example of a method for ESI gathering. In the example of FIG. 4, the flowchart 400 starts at module 402 where one or more search engines and/or content repositories are selected. Some search engines may be more effective than others in finding ESI that are responsive to a market. For example, search engines designed to search medical content are more apt to find documents responsive to a medical market such as "physicians treating arteriosclerosis" than documents responsive to a consumer market such as "consumers shopping for goods or services." By selecting the search engines and content repositories better suited to finding ESI responsive to a specific market, an ESI gathering engine can reduce the time it takes to find those documents and reduce the computer processing power requirements, storage needed, and cost spent to find, gather, and later analyze those documents for needs.

An example of a search engine protocol is the financial information exchange (FIX) protocol for electronic communication of trade-related messages. It is a self-describing protocol in many ways similar to other self-describing protocols such as XML. (XML representation of business content of FIX messages is known as FIXML.) FIX Protocol, Ltd. was established for the purpose of ownership and maintenance of the specification and owns the specification, while keeping it in the public domain. FIX is provided as an example in this paper because FIX is a standard electronic protocol for pre-trade communications and trade execution. Another example of a protocol is Society for Worldwide Interbank Financial Telecommunication (SWIFT). Yet another example is FIX adapted for streaming (FAST) protocol, which is used for sending multicast market data. FAST was developed by FIX Protocol, Ltd. to optimize data representation on a network, and supports high-throughput, low latency data communications. In particular, it is a technology standard that offers significant compression capabilities for the transport of high-volume market data feeds and ultra low latency applications. Exchanges and market centers offering data feeds using the FAST protocol include: New York Stock Exchange (NYSE) Archipelago, Chicago Mercantile Exchange (CME), International Securities Exchange (ISE), to name a few. In operation, a search engine can search data streams for relevant data for tagging; identifying competitors; and populating product, market communications, service programs, NPD tables, etc. FAST is a good example protocol because of its use in market-related communications that are reasonably likely to be relevant to those who use one or more of the techniques described in this paper.

In the example of FIG. 4, the flowchart 400 continues to module 404 where ESI queries are translated for a subset of the search engines. Many search engines have unique requirements for formulating queries. So it is desirable to translate a formulated ESI query into a form that a selected search engine understands and can process. Some search engines may use the ESI query format, requiring no translation, and some search engines may simply improve search results if translated, though a search would work using the ESI query format. For this reason, the module 404 could be considered optional.

In the example of FIG. 4, the flowchart 400 continues to module 406 where queries are sent to the one or more search engines. There are a variety of sources of data that search engines can search such as, by way of example but not limitation, the World Wide Web, corporate databases, and strategist-provided ESI. The World Wide Web includes the use of crawler-based search engines, meta search engines, shopping search engines, subject specific search engines, content repositories, product review sites, social media search engines, emerging Web 3.0 technologies including semantic search, etc. Corporate databases include strategist group forums, customer complaint databases, sales force automation databases, minutes from customer councils, customer surveys, company websites, partner research, brand research, benchmark reports, third-party research, competitive intelligence reports, employee research, executive presentations, product research, test reports, etc. Representative examples of strategist-provided ESI include transcripts from interviews with customers, primary and secondary market research reports, key research papers, etc.

In the example of FIG. 4, the flowchart 400 continues to module 408 where replies from the search engines are received and to module 410 where ESI is retrieved. Documents created as a result of gathering needs directly from customers to fill gaps in knowledge that were not discovered or are not automatically discoverable can loop back to this point.

In the example of FIG. 4, the flowchart 400 continues to module 412 where ESI is converted into a desired format. The documents retrieved are not necessarily in the desired or optimal format for analysis by the USIMS. Any of a number of actions can be taken to convert retrieved documents into a desired format: Transcribe audio and video files, extract text from an image using Optical-Character Recognition (OCR), translate foreign-language text into a desired language, etc.

In the example of FIG. 4, the flowchart 400 continues to module 414 where ESI is deduplicated. It is likely that the responses to queries will overlap and produce the same results two or more times. There are many instances on the Internet in which an entire document may be found and retrieved in more than one format. Further, portions of a reply may be reproduced in part, in whole, exactly, or approximately within another reply. It is desirable to deduplicate these redundant replies to minimize the time, computer processing power, storage, and cost needed to analyze the library of retrieved documents for needs. To accomplish this goal, it may be desirable to use a comparison engine (not shown) to compare ESI and eliminate duplicates.

In the example of FIG. 4, the flowchart 400 continues to module 416 where candidate ESI is stored. The candidate ESI can be used to extract, synthesize, and organize need statements.

Referring once again to the example of FIG. 2, the needs gathering engine 206 uses candidate ESI from the ESI gathering engine 204 to tag, parse, and extract need statements from ESI. The needs gathering engine 206 is coupled to a rules data store 226, which includes rules such as, by way of example but not limitation, grammar rules, tagging rules, semantics, document rules, clause type rules, netting rules, and the like. The needs gathering engine 206 stores needs in a needs data store 228.

Figure 5:
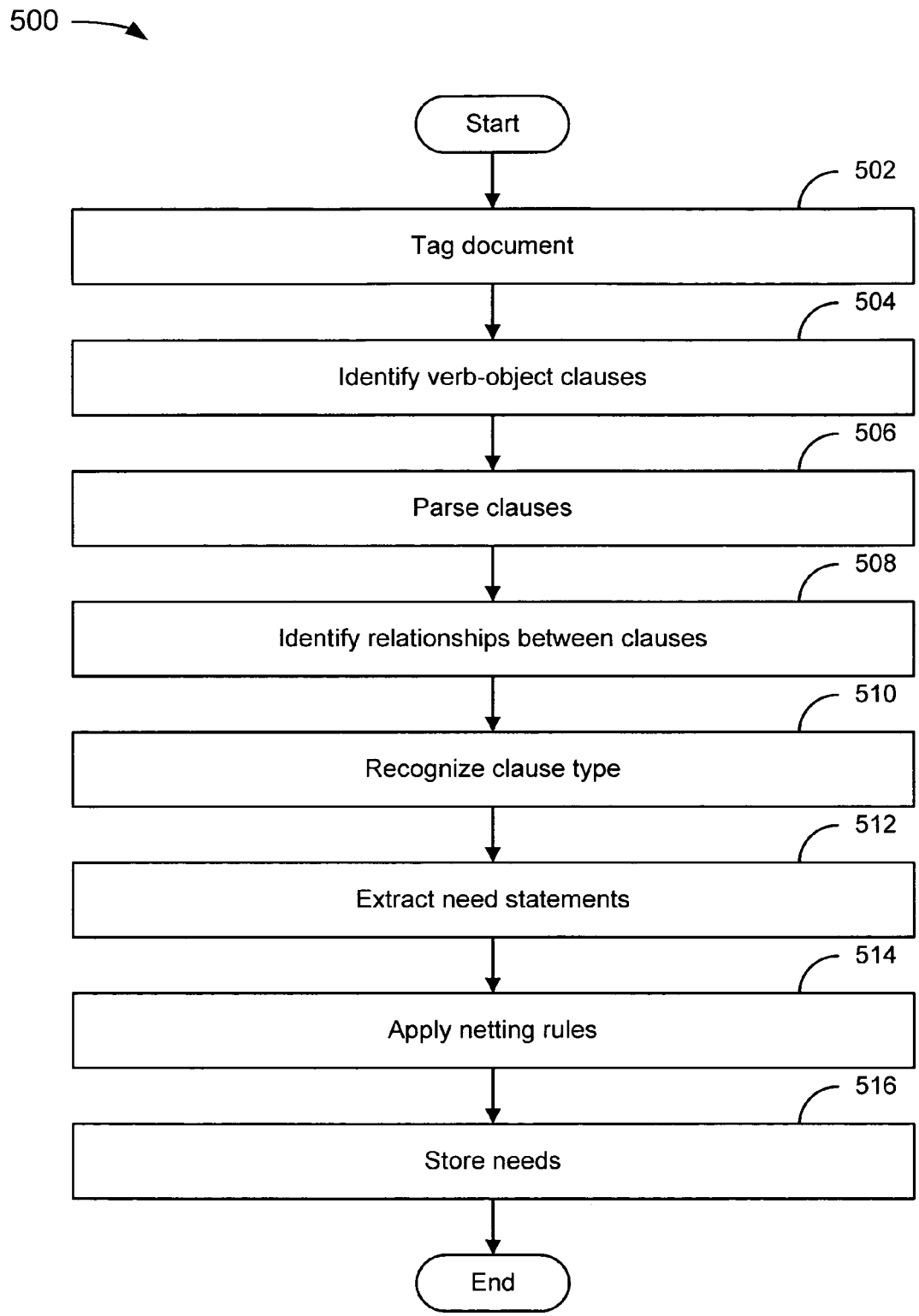
FIG. 5 depicts a flowchart of an example of a method for gathering needs relevant to a market.

FIG. 5 depicts a flowchart 500 of an example of a method for gathering needs relevant to a market. In the example of FIG. 5, the flowchart 500 starts at module 502 where documents are tagged. Lists of words, word phrases, and linguistic patterns can be used to locate need statements in raw form, to determine whether a clause is referring to a need, want, benefit, problem, solution, or specification, to define what metric to use if the clause refers to an outcome (time, problems, output, waste), to define the object of control, to define the contextual clarifier, and to define examples. To this end, grammar rules, semantics, tagging rules, and other data stores can be used. Here is an example of a tagged portion of a document: "The ankle-brachial index (ABI) is a useful test (Solution) to compare (Verb) pressures (Object) in the lower extremity to the upper extremity (Contextual Clarifier). Blood pressure normally is slightly higher in the lower extremities than in the upper extremities. Comparison to the contralateral side (Solution) may suggest (Verb) the degree of ischemia (Object)."

More generally, as used in this paper, tagging can include adding meta-data associated with business information to data records, pipeline prioritization, calculation, ranking and reporting of opportunity scores, interaction with data, and other functionality that makes data more useful in a BI context.

In the example of FIG. 5, the flowchart 500 continues to module 504 where verb-object clauses are identified. When identifying clauses, the same or similar data stores as used to tag documents (e.g., grammar rules, tagging rules, semantics, etc.) can be used. It might be desirable to tag documents and identify verb-object clauses serially as depicted, in reverse order, or at the same time or to refine results after receiving feedback. Here is an example of identified clauses for the tagged portion of the document: The ankle-brachial index (ABI) is a useful test (Clause) to compare pressures in the lower extremity to the upper extremity (Clause). Blood pressure normally is slightly higher in the lower extremities than in the upper extremities. Comparison to the contralateral side (Clause) may suggest the degree of ischemia (Clause).

In the example of FIG. 5, the flowchart 500 continues to module 506 where clauses are parsed. TABLE 2 depicts the clauses for the ongoing example.

TABLE 2

| Clause | Text |
| --- | --- |
| 1 | The ankle-brachial index (ABI) is a useful test |
| 2 | Compare pressures in the lower extremity to the upper extremity |
| 3 | Comparison [ankle-brachial index] to the contralateral side |
| 4 | May suggest the degree of ischemia |

In the example of FIG. 5, the flowchart 500 continues to module 508 where relationships between clauses are identified. Document elements, including heading, sub-headings, paragraphs, topic sentences, meta-tags, prepositions, etc., establish relationships between concepts in documents. This information can be provided in a data store of document rules that is used to establish relationships between solutions and needs gathered from a document.

TABLE 3 depicts the relationship between clauses for ongoing example.

TABLE 3

| Clause | Text |
| --- | --- |
| 1 | The ankle-brachial index (ABI) is a useful test |
| 1a | Compare pressures in the lower extremity to the upper extremity |
| 2 | Comparison [ankle-brachial index] to the contralateral side |
| 2a | May suggest the degree of ischemia |

In the example of FIG. 5, the flowchart 500 continues to module 510 where clause type is recognized. Different types of clauses are distinguishable—such as clauses that refer to wants, solutions, specifications, etc.—and queries can be formulated to clarify the need or benefit those wants, solutions, and specifications. For example, "ankle-brachial index" is a solution to "compare pressures . . . ," which is itself a solution to an underlying need not mentioned in the example paragraph. New queries can be formulated to search for the underlying need, such as to define "ankle-brachial index" and to discover the reasons to "compare pressures in the lower extremity to the upper extremity". A data store of clause type rules can be used to recognize clause types. Output associated with module 510 can be referred to as refinement data, and can be useful when modifying queries to locate ESI about the market.

In the example of FIG. 5, the flowchart 500 continues to module 512 where need statements are extracted. The formation of need statements follows specific rules so as to match the relevant data structure. The best form for job statements is "[verb]+[object of control]+[contextual clarifier]+[examples of the object of control]." The best form for desired outcomes is "[direction of improvement]+[unit of measure]+[object of control]+[contextual clarifier]+[examples of object of control]."

TABLE 4 identifies (in italics) a need statement for ongoing example.

TABLE 4

| Clause | Text |
| --- | --- |
| 1 | The ankle-brachial index (ABI) is a useful test |
| 1a | Compare pressures in the lower extremity to the upper extremity |
| 2 | Comparison [ankle-brachial index] to the contralateral side |
| 2a | *May suggest the degree of ischemia* |

In the example of FIG. 5, the flowchart 500 continues to module 514 where netting rules are applied. Needs are often not presented in document in the form needed. Vague words should be clarified; duplicates should be eliminated; etc. Needs statements should state the customer's measure of value, should not be ambiguous, should not introduce a source of variability into the quantitative research (e.g., reduce versus minimize), should be capable of being measured, should be free of solutions and specifications, and should be stable over time. A netting rules data store can be used to refine a need statement. For example, "may suggest the degree of ischemia" could be refined to say, "determine the degree of ischemia in a patient."

In the example of FIG. 5, the flowchart 500 continues to module 516 where needs are stored. From here, extracted needs, their relationships to other needs and solutions, and other information pertaining to the document from which they were gathered can be sent to an engine to determine their relevance to the selected market.

Referring once again to the example of FIG. 2, the query modification engine 208 and the gap identification engine 210 receive refinement data from the needs gathering engine 206. The query modification engine 208 has functionality similar to the query formulation engine 202 (see, e.g., FIG. 3) in that it uses rules to formulates, deduplicates, and stores ESI queries. However, inputs needed to formulate additional queries are received from the needs gathering engine 206. The additional queries can be sent to a proprietary search engine or a second-party search engine to locate candidate ESI throughout the World Wide Web, accessible corporate databases, and strategist-provided ESI. The process can be in batch mode (e.g., when the query modification engine 208 completes its last iteration, the ESI queries are provided as feedback to the ESI gathering engine 204), the ESI gathering engine 204 can receive the additional ESI queries after each iteration, or the ESI gathering engine 204 can receive additional ESI queries as they become available in some other time frame. It may be desirable to provide a loop limit for the query modification engine 208 to prevent run-away or endless progressions of query building. As an example, the results from a prior query may lead to the discovery that "Solution 'XYZ'" is used to treat arteriosclerosis. Forming new queries with the tag "Solution 'XYZ'" may yield documents that also refer to needs that are responsive to the market. Due to the similarities between the query formulation engine 202 and the query modification engine 208, it may be efficient to create a module that both the query formulation engine 202 and the query modification engine 208 can use.

The gap identification engine 210 can assess the degree to which a query was answered, formulate an interview guide for customer interviews, and store the interview guide. Some queries will go unanswered, some queries will be unanswerable, and some needs will not be gatherable from available ESI. To reduce the likelihood the gathered needs are incomplete, the algorithm facilitates a strategist in formulating strategies and establishing execution tactics needed to gather needs directly from customers that may be infrequent, subconscious, undocumented, or otherwise back-of-mind. An interview guide is an outline that an interviewer uses to lead a discussion with a customer or group of customers. The guide identifies the questions and topics that an interview will cover in an interview session, and the approximate emphasis that will be given to each. Identified gaps in the needs hierarchy can be used to formulate the interview guide. Results of a customer interview can be provided to the ESI gathering engine 204 as feedback.

The relevance determination engine 212 is coupled to the market tags data store 220 generated, at least in part, by the query formulation engine 202. The market tags are used to assess the relevance of documents and needs returned by a search. The relevance determination engine 212 is also coupled to the needs data store 228 generated, at least in part, by the needs gathering engine 206. The needs data store 238 is refined as the relevance determination engine 212 prioritizes, purges, and deduplicates the needs data store 228.

Figure 6:
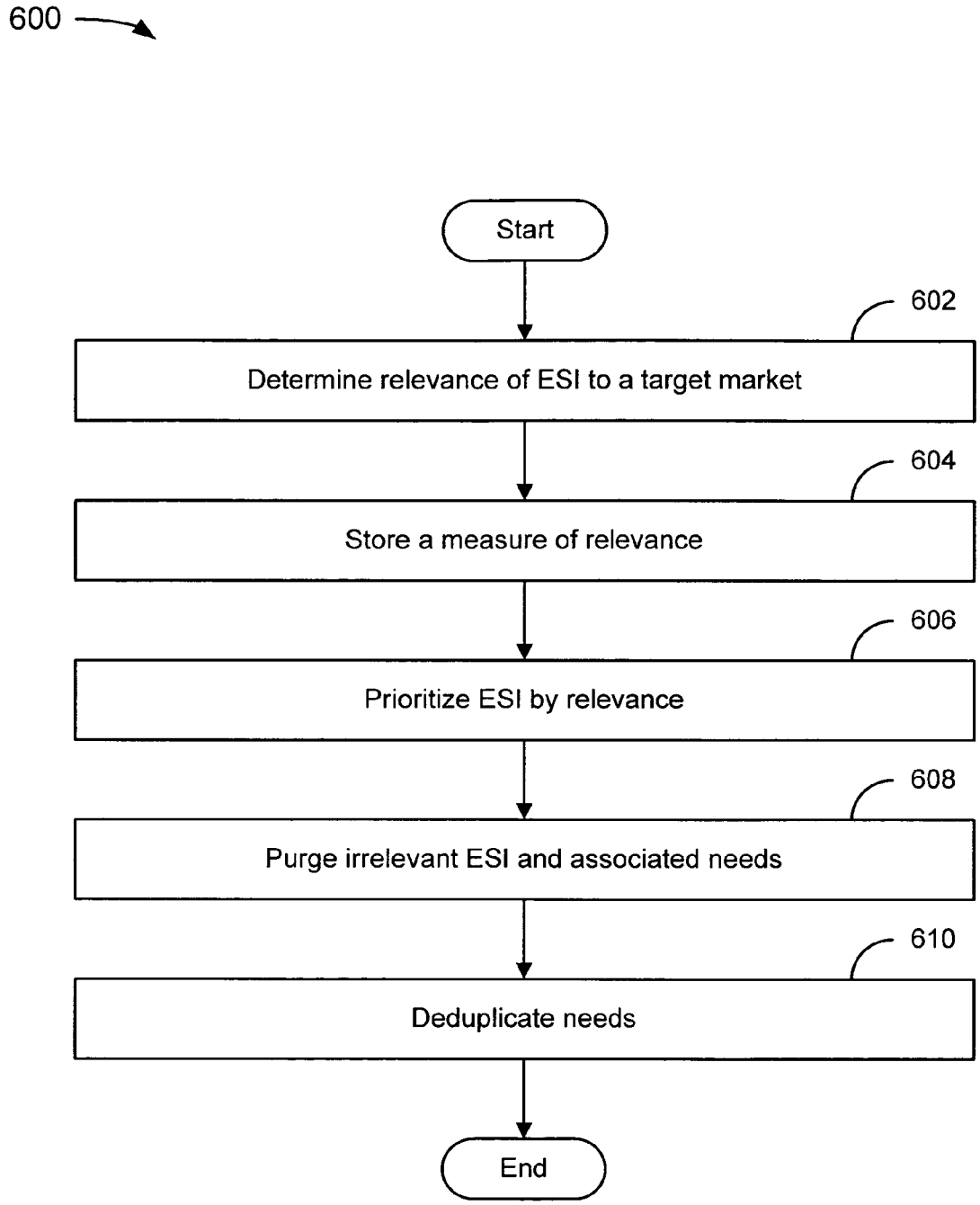
FIG. 6 depicts a flowchart of an example of a method for determining the relevance of gathered needs to a target market.

FIG. 6 depicts a flowchart 600 of an example of a method for determining the relevance of gathered needs to a target market. In the example of FIG. 6, the flowchart 600 starts at module 602 where relevance of ESI to a target market is determined. To make the determination, it may be desirable to receive market tags, currently extracted needs, and measures of relevance, which can be provided in market tags, needs, and measures of relevance data stores. The determination will likely make use of a comparison engine (not shown).

In the example of FIG. 6, the flowchart 600 continues to module 604 where a measure of relevance is stored and to module 606 where ESI is prioritized by relevance. Relevant ESI can be presented to a strategist to increase knowledge of the target market.

In the example of FIG. 6, the flowchart 600 continues to module 608 where irrelevant ESI and associated needs are purged. By purging irrelevant ESI the time it takes to formulate and populate the needs hierarchy can be reduced and the computer processing power, storage, and cost needed to do so can be reduced as well.

In the example of FIG. 6, the flowchart 600 continues to module 610 where a needs data store is deduplicated. By deduplicating the needs data store the time it takes to formulate and populate the needs hierarchy can be reduced and the computer processing power, storage, and cost needed to do so can be reduced as well. From here, the gathered and optimized need statements can be used to formulate a job map and populate a needs hierarchy for the market.

Referring once again to the example of FIG. 2, the job map formulation engine 214 uses the needs data store 228, refined by the relevance determination engine 212, to formulate a job map. Establishing the job map helps the USIMS, and perhaps a strategist, to bound the subject area in which outcomes will be captured, determine when all outcomes are captured, discover the optimal sequence in which a complex job should be executed, understand what other functions a product should perform (e.g., most products execute part of the overall job the customer wants done), and find opportunities for innovation at each process step.

Figure 7:
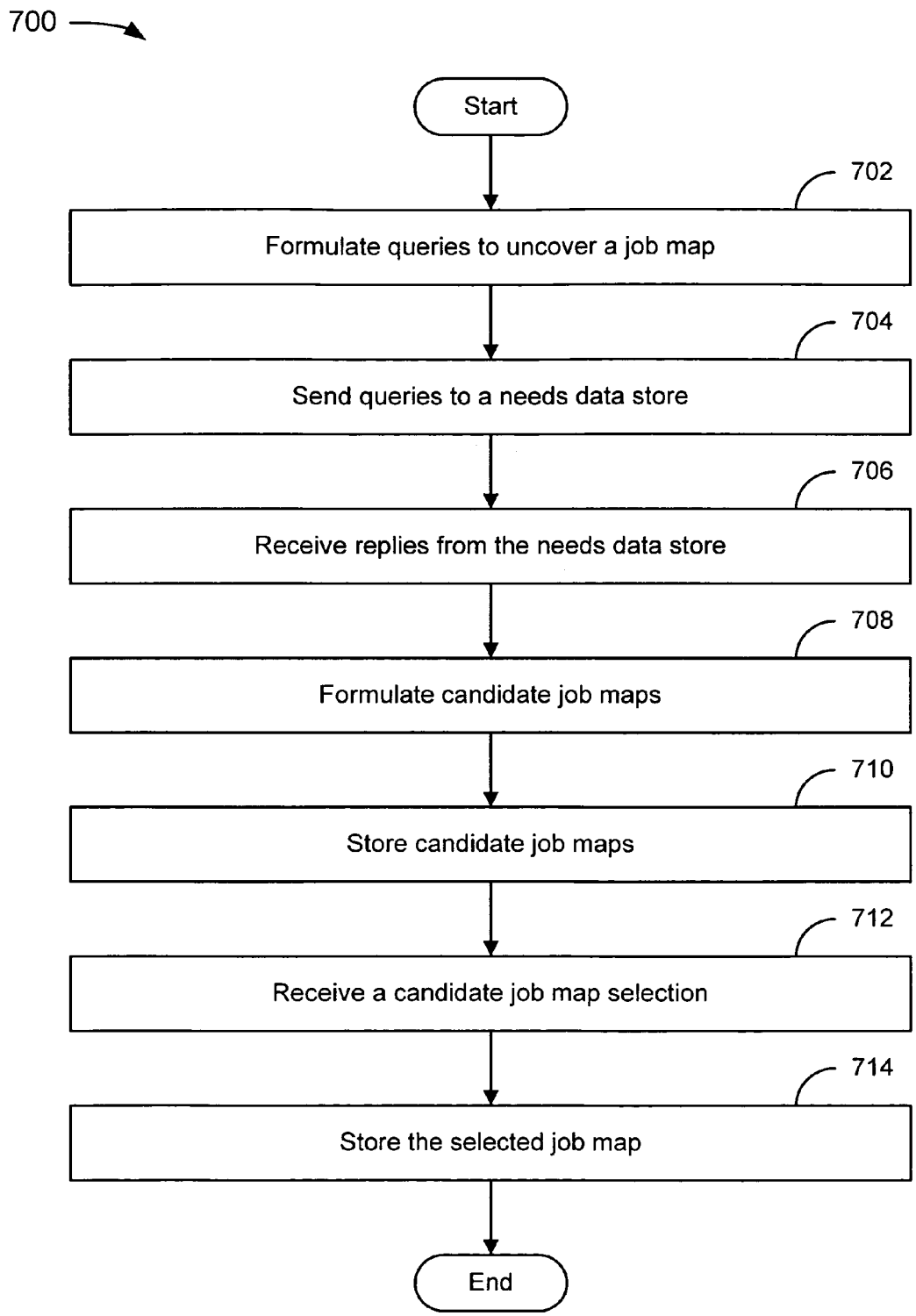
FIG. 7 depicts a flowchart of an example of a method for formulating a job map.

FIG. 7 depicts a flowchart 700 of an example of a method for formulating a job map. In the example of FIG. 7, the flowchart 700 starts at module 702 where queries to uncover a job map are formulated. The queries should be formulated, using a rules data store, to answer questions such as:

1. What are the most central tasks that must be accomplished to get the job done?

2. What must happen before the core steps to ensure the job is successfully carried out?

3. What must be defined or planned before the core steps? For example, what must be located or gathered? What must be prepared or set up? What must be confirmed before the core steps?

4. What must happen after the core steps to ensure the job is successfully carried out? For example, what must be monitored or verified after the core steps to ensure the job is successfully performed? What must be modified or adjusted after the core steps?

5. What must be done to properly conclude the job or to prepare for the next job cycle?

A market can be framed a number of ways, such as:

1. Across substitutes: Treat arteriosclerosis (e.g., whether by surgery, radiation, pharmacology, etc.);
2. Across product group competitors: Treat arteriosclerosis surgically (minimally invasive or open techniques);
3. Across product form competitors: Treat arteriosclerosis with a stent;
4. Within a context: Treat arteriosclerosis in men.

There are variations in which the market can be framed, using levels at which a job can be defined, and it may be desirable to gather needs responsive to each framing.

In the example of FIG. 7, the flowchart 700 continues to module 704 where queries are sent to a needs data store and to module 706 where replies are received from the needs data store.

In the example of FIG. 7, the flowchart 700 continues to module 708 where candidate job maps are formulated. A universal job map is a depiction of a functional job, deconstructed into its discrete process steps, that explains in detail exactly what the customer is trying to get done. Unlike a process map, a job map does not show what the customer is doing (a solution view); rather, it describes what the customer is trying to get done (a needs view). Analysis of hundreds of jobs has revealed that all jobs consist of some or all of the eight fundamental processes: define, locate, prepare, confirm, execute, monitor, modify, and conclude. This insight is essential for creating a framework around which customer needs (outcomes) are gathered.

Several job maps, corresponding to the number of ways a market can be framed, are formulated to increase the likelihood that the job map most relevant to the strategist's objectives is discovered. For example, the job map for "Treating arteriosclerosis surgically" may be discovered and defined.

Figure 8:
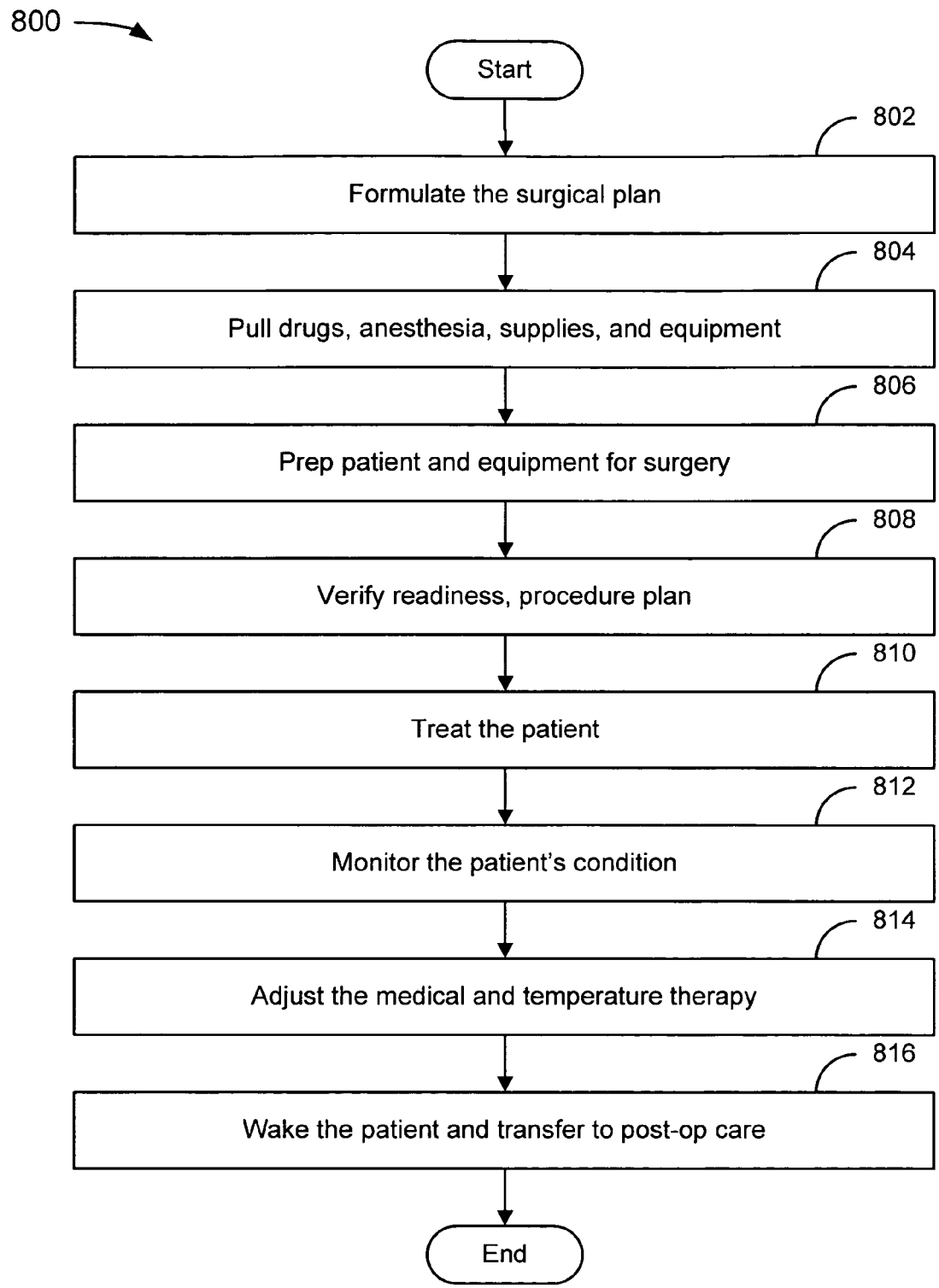
FIG. 8 depicts an example of a job map for "Treating arteriosclerosis surgically."

FIG. 8 depicts an example of a job map for "Treating arteriosclerosis surgically." In the example of FIG. 8, the flowchart 800 starts at module 802 where a surgical plan is formulated; continues to module 804 where drugs, anesthesia, supplies, and equipment are pulled, to module 806 where a patient and the equipment are prepped for surgery, to module 808 where a readiness, procedure plan is verified, to module 810 where the patient is treated, to module 812 where the patient's condition is monitored, and to module 814 where the medical and temperature therapy are adjusted; and ends at module 816 where the patient is woken and transferred to post-op care.

Referring once again to FIG. 7, in the example of FIG. 7, the flowchart 700 continues to module 710 where candidate job maps are stored and to module 712 where a candidate job map selection is received. This can involve displaying candidate job maps to a strategist, an artificial intelligence (AI), or both. The strategist can select a job map and adjust the definition, number, and order of steps to formulate the job map that is most appropriate for their objectives.

In the example of FIG. 7, the flowchart continues to module 714 where the selected job map is stored. With the job map defined, the USIMS is ready to begin populating it and other elements of a needs hierarchy.

Referring once again to the example of FIG. 2, the needs generation engine 216 receives the job map from the job map formulation engine 214. The needs generation engine 216 is coupled to the needs data store 228, the identified gaps data store 234, and a rules data store 236. The needs generation engine 216 uses the job map and the data stores to populate a needs hierarchy. The needs hierarchy establishes the structure and relationship of all customer inputs that are needed to effectively execute the innovation process.

Figure 9:
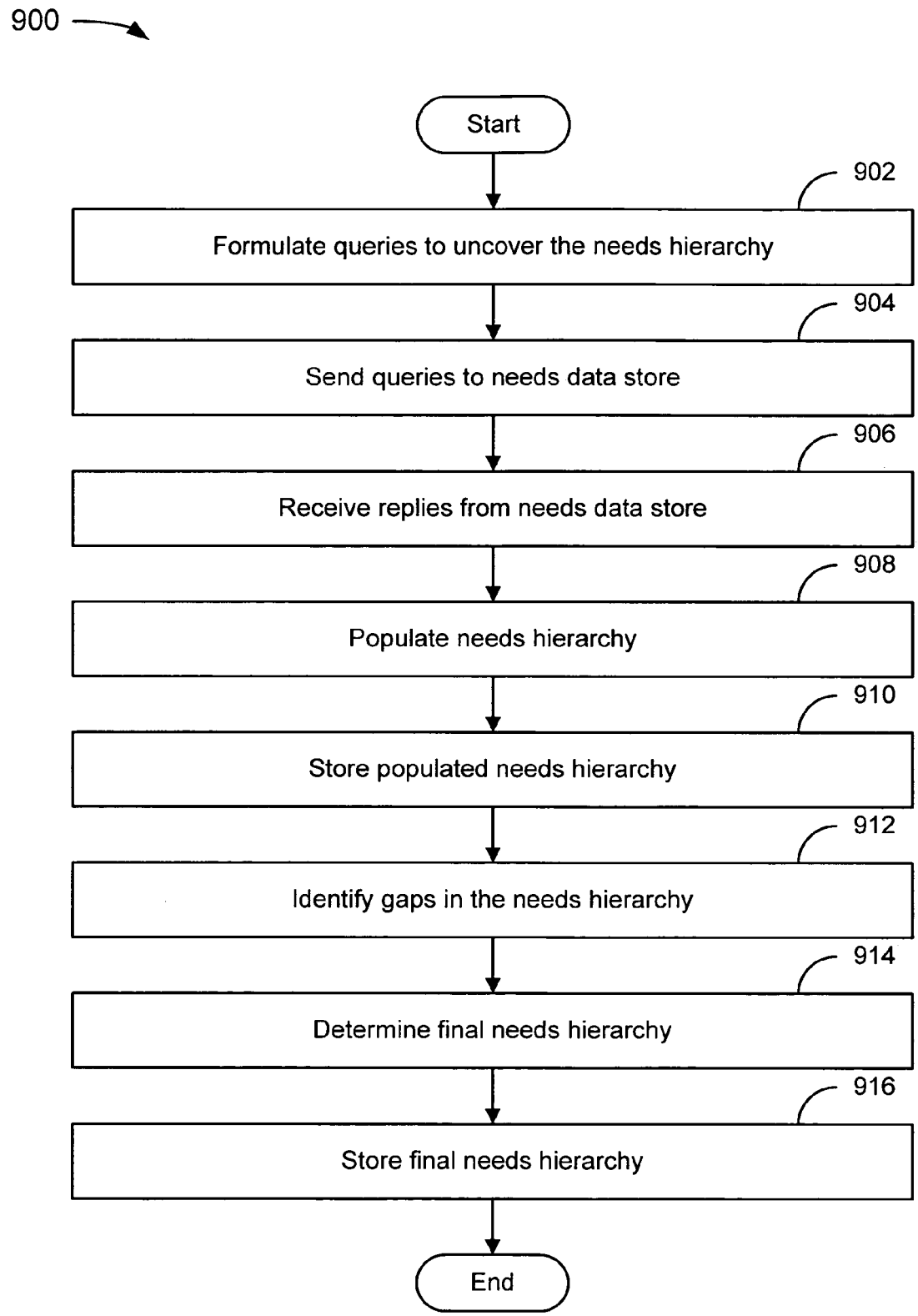
FIG. 9 depicts a flowchart of an example of a method for populating a needs hierarchy.

FIG. 9 depicts a flowchart 900 of an example of a method for populating a needs hierarchy. To gather outcomes on each step of the job map it is advantageous to form queries to answer questions such as the following:

1. What issues are faced when performing each step?
2. What makes each step—or parts of it—challenging, inconvenient, or frustrating? The responses here will point to pitfalls that should be addressed when creating a product.
3. What makes each step time consuming? The responses here will help to determine whether a product that speeds up the process would be successful.
4. What makes each step go off track? The responses here will help uncover opportunities to reduce instability.
5. What aspects of each step are wasteful? The responses here will help find ways to boost efficiency.

To gather jobs related to the job map it is advantageous to form queries to answer questions such as the following:

1. What are the tasks, goals, or objectives the demographic is trying to accomplish or problems they are trying to resolve by getting the job done?
2. What are the tasks, goals, or objectives the demographic is trying to accomplish or problems they are trying to resolve when getting the job done? Before? After?
3. How does the demographic want to feel and be perceived when getting the job done?
4. What feelings and perceptions do the demographic want to avoid when getting the job done?

Regardless of the market, some needs are universal to getting certain jobs done. For example, physicians, attorneys, consultants, and other professional who operate a business in order to deliver their services are all trying to get jobs done related to, "running a business". Similarly, outcomes on many jobs such as, "formulating a strategy" are similar regardless of whether a consumer is formulating a strategy to "achieve a desired body weight" or a physician is trying to cure a patient. In these cases the universal outcomes may be applicable without modification or with slight customization of the object of control, contextual clarifiers, or examples. Applying these universal needs is beneficial in ensuring the formulated queries and the populated needs hierarchy is complete.

In the example of FIG. 9, the flowchart 900 continues to module 904 where queries are sent to a needs data store and to module 906 where replies are received from the needs data store.

In the example of FIG. 9, the flowchart 900 continues to module 908 where a needs hierarchy is populated and to module 910 where the populated needs hierarchy is stored.

Figure 10:
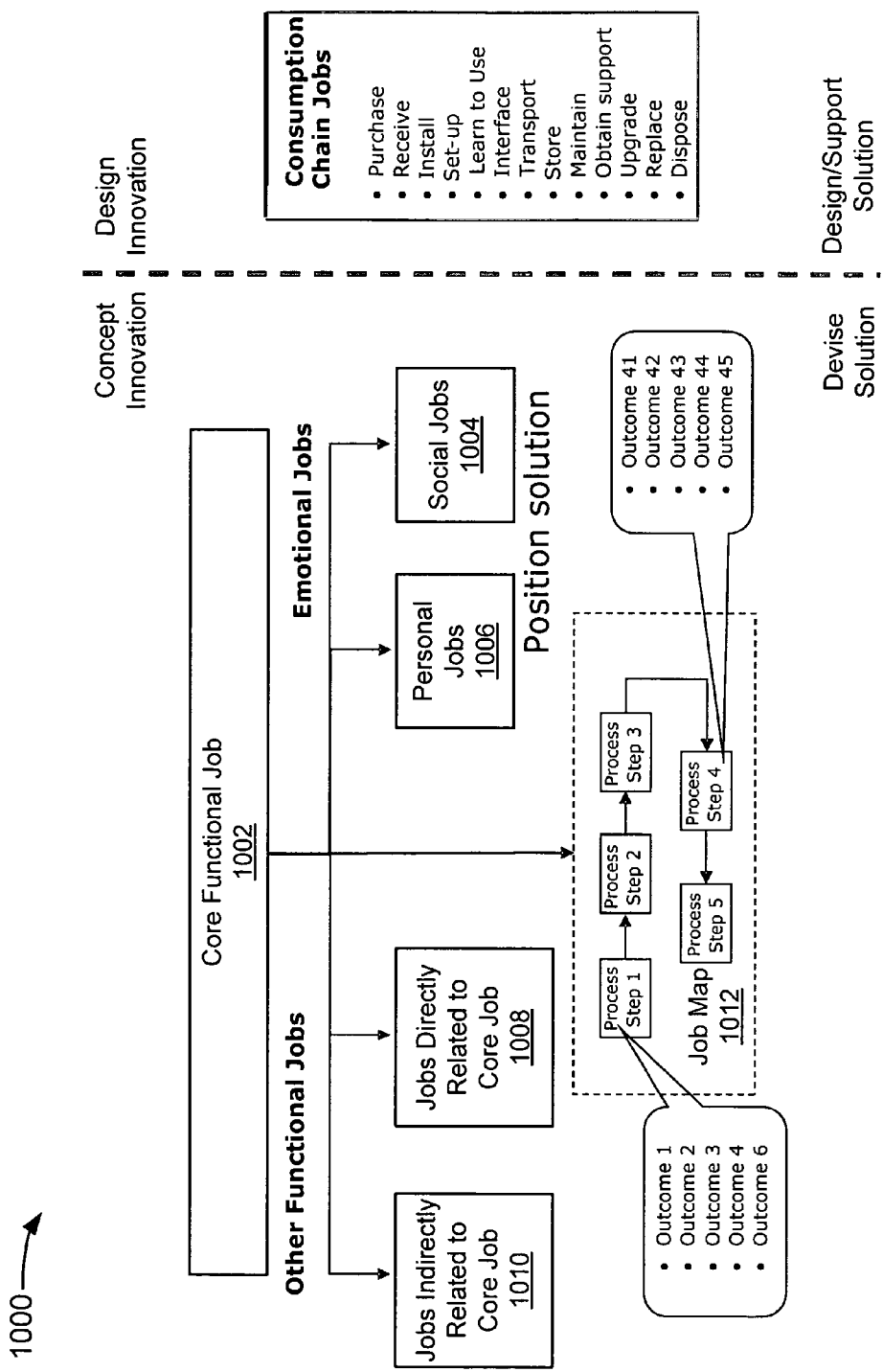
FIG. 10 depicts a conceptual diagram of how a needs hierarchy can be populated.

FIG. 10 depicts a conceptual diagram 1000 of how a needs hierarchy can be populated. The diagram starts with a core functional job 1002 at concept innovation. As concept innovation moves in the direction of devising a solution, the core functional job 1002 can be defined in association with one or more identified emotional jobs or other functional jobs. Emotional jobs can include, for example, social jobs 1004 and personal jobs 1006. Other functional jobs can include, for example, jobs directly related to the core job 1008 and jobs indirectly related to the core job 1010. When processes to accomplish the various jobs are identified, a job map 1012 can be created. The job map 1012 includes a sequence of process steps, each of which can be characterized as a job (or sub-job) of the core functional job 1012 with respective outcomes at each process step. The outcomes are illustrated by way of example in the example of FIG. 10 as quote balloons from process step 1 and process step 4 in the job map 1012. It should be noted that process steps can occur in parallel (instead of serial) or an order that may be determinative or optional depending upon the nature of the job (e.g., if a first step has an outcome that is needed to proceed to a second step, it may be necessary for the first job to be completed before the second job can be completed). Desired outcomes are the metrics customers can use to measure the successful execution of a job.

Referring once again to the example of FIG. 9, the flowchart 900 continues to module 912 where gaps in the needs hierarchy are identified. A universal needs data store and rules to identify gaps in the needs hierarchy can help to identify the gaps. From here, the identified gaps in the needs hierarchy can be used as inputs to formulate an interview guide to gather missing needs directly from customers.

In the example of FIG. 9, the flowchart 900 continues to module 914 where the final needs hierarchy is determined. This can involve a strategist evaluating and modifying the needs. For example, depending upon the embodiment, the strategists can select and adjust the definition, number, and order of needs statements to arrive at a final set of needs that are most appropriate to their objectives.

In the example of FIG. 9, the flowchart 900 continues to module 916 where a final needs hierarchy is stored. Now finalized, the needs can be rated for importance and satisfaction by customers, as well as other metrics, to determine which needs are unmet and worthy of investment.

Figure 11:
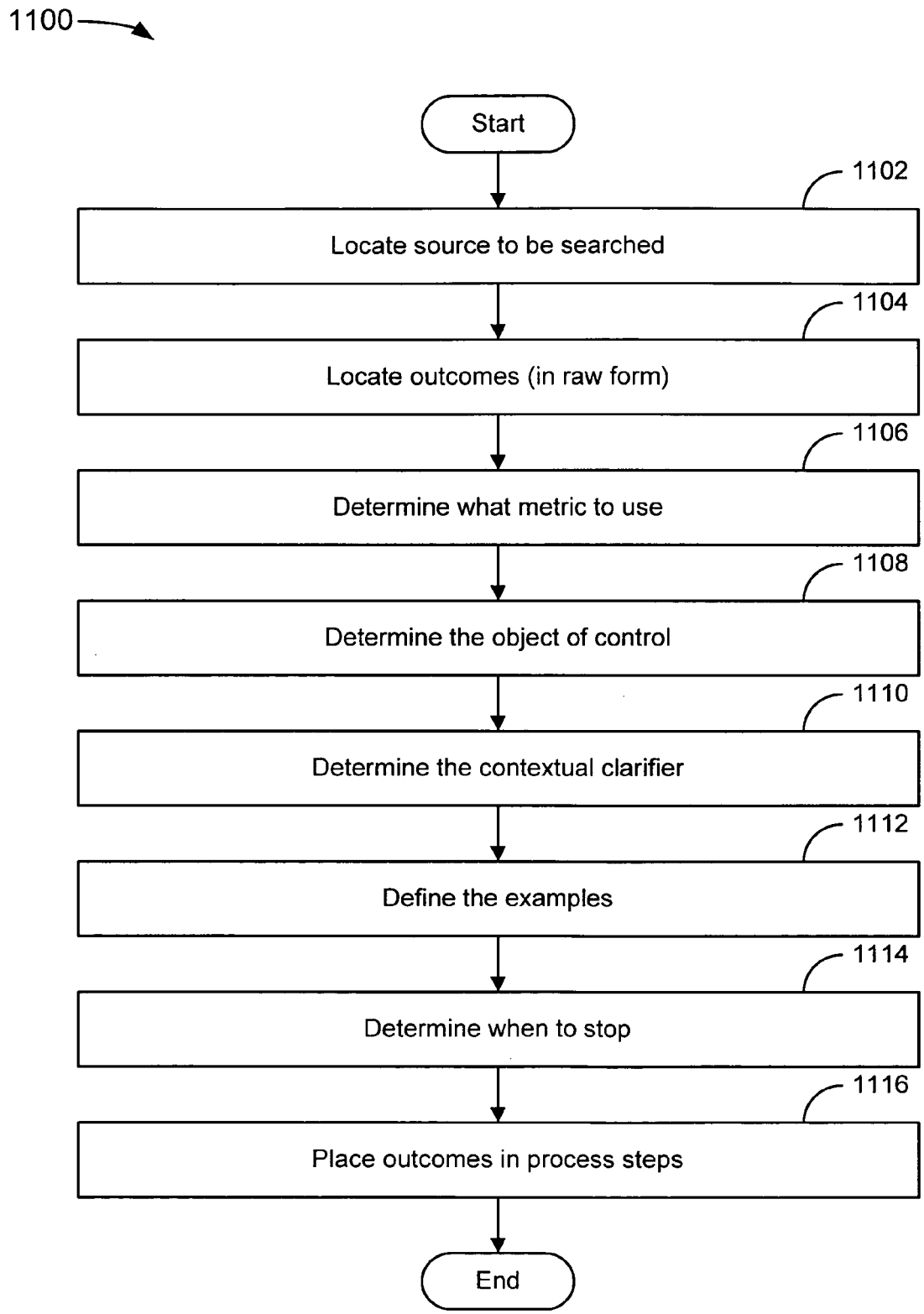
FIG. 11 depicts a flowchart of an example of a method for obtaining outcomes from ESI.

FIG. 11 depicts a flowchart 1100 of an example of a method for obtaining outcomes from ESI. In the example of FIG. 11, the flowchart 1100 starts at module 1102 with locating a source to be searched. Since it is a design goal to break data into jobs, it can be desirable to locate a data source that talks about one job. This does not mean that only a single job will be referenced in a document or any other such unnecessary limitation, but does mean that eventually it will be desirable to hone in on a single job, whether by locating ESI with a single job in a file, database, or page, or by parsing a data structure to locate a single job. An efficient source of data can be a questionnaire specifically designed to elicit a response related to a job. Within a job, a desired outcome statement should be determinable, either by using the source, or the source plus other relevant data. An example of a desired outcome statement can include "[Direction of improvement] . . . [Unit of measure] . . . [Object of control] . . . [Contextual clarifier] . . . [Example of object of control]."

Locating sentences that refer to a want/benefit relies upon a search engine. A goal of the search engine is to determine whether there is enough evidence to infer that a given sentence refers to a want/benefit. The search engine begins with the assumption that a given sentence does not refer to a want/benefit. It then searches for key words, concepts, and linguistic patterns that are predictive of want/benefit statements. In the absence of "sufficient evidence" the sentence is ignored. This cycle is repeated until all of the sentences that refer to a want/benefit in a collection of sentences have been located.

Two general errors can be made by the search engine, false positives and false negatives. These errors are inversely related, meaning that any attempt to reduce one is likely to increase the other all else being equal. Table 5 illustrates four general results (including the two errors) of a search engine:

TABLE 5

| Search Results | Actual Conditions | |
|---|---|---|
| | The sentence does not refer to a want/benefit | The sentence refers to a want/benefit |
| The sentence does not refer to a want/benefit | True | False positive, i.e., Type II error, $\beta$ |

TABLE 5-continued

| Search Results | Actual Conditions | |
|---|---|---|
| | The sentence does not refer to a want/benefit | The sentence refers to a want/benefit |
| The sentence refers to a want/benefit | False negative, i.e., Type I error, significance level, $\alpha$ | True |

It is desirable to design the algorithm so that the probability of falsely identifying a sentence that does not refer to a want/benefit as one that does is small. It is better to "ignore 100 statements that refer to a want/benefit than to locate 1 statement that does not" because time spent by a consultant reviewing nonresponsive statements is expensive. The consequence is that the probability of ignoring responsive sentences is relatively high. A Type I statistical error can be referred to as an error of excessive credulity while a Type II statistical error can be referred to as an error of excessive skepticism. Because of the design goal to favor Type II over Type I statistical error, the search engine can be referred to as an "excessively skeptical" search engine, or a search engine with high specificity.

This leads to a means of judging the effectiveness of a given algorithm by determining the proportion of sentences that refer to a want/benefit that are misidentified. The "power" of a given algorithm is the probability of it identifying a given sentence as referring to a want/benefit when it in fact does. It is calculated as $1-\beta$. Given the same source document and significance level, the algorithm that is correct more frequently will have a higher power and can be said to be more powerful.

The search engine's task is to determine if a given sentence contains key words, concepts, and linguistic patterns that are predictive of want/benefit statements. Assumption: The outcomes are written, in some format, in a sentence, somewhere in the world. It should be noted that this assumption need not be true to obtain outcomes, but it is generally more cost-effective.

In the example of FIG. 11, the flowchart 1100 continues to module 1104 with locating outcomes (in raw form). Advantageously, it has been found that certain words have a high probability of leading to a job or outcome statement when employed in coordination with a data parsing algorithm. Specifically, when talking about a solution: enable, enable to, enables, will enable; allow, allow to, allows, will allow; easy, easy to; simple, simple to, simplify; possible, possible to; unwanted; minimize, decrease, reduce; maximize, increase; prevent, avoid, eliminate, empower. When talking about a job: able, able to; try, trying, trying to; want, want to; need, need to; have to; got to. When talking about a problem: difficult, difficult to, difficulty, difficulty in; hard, harder; impossible; worse.

In the example of FIG. 11, the flowchart 1100 continues to module 1106 with determining what metric to use. A sentence that is selected through search and placed in a process step can be searched for any of the following adjectives or adverbs. The presence of these words will enable the assignment of a specific metric to the outcome statement (time, likelihood, waste, etc.). Specifically, when talking about speed (minimize the time it takes to . . . ; minimize the amount of time . . . ): fast, faster; quick, quickly; slow, slower, slowly; rapid, rapidly; swift, swiftly; prompt, promptly; instantly, instantaneously; right away, straight away; immediately; at once; without delay; convenient, conveniently, inconveniently; automatically; hour, minute; day, second, year. When talking about stability or lack of variation (minimize the likelihood of/that . . . ): consistent, inconsistent; reliable, unreliable; dependable, undependable; predictable, unpredictable; certain, uncertain; stable, unstable; intended, unintended; planned, unplanned; intentional, unintentional; advertent, inadvertent; likely, unlikely, likelihood; accurate, inaccurate; correct, incorrect; precise, imprecise; regular, irregular; erratic; sporadically; complication. When talking about output (minimize the amount of waste/yield loss/downtime/productivity loss): efficient, efficiently, inefficient, inefficiently; effective, effectively, cost effective, ineffective, ineffectively; productive, productively, unproductively; waste, wastefully; economically; usefully; badly; poorly; imperfectly; inadequately; deficiently; cheaply; inexpensively; yield; downtime; output; constantly; continuously. When talking about output (minimize the amount of yield loss/downtime/productivity loss): effective, effectively, ineffective, ineffectively; productive, productively, unproductively; yield; downtime; output; badly; deficiently; perfectly, imperfectly; adequately, inadequately; poorly; usefully; constantly, intermittently; continuously. When talking about waste (minimize the amount of waste): efficient, efficiently, inefficient, inefficiently; waste, wastefully; economically; cost effective; cheaply; inexpensively. When the goal is to uncover desired outcomes related to getting the job done effectively with high output or yield, ask the customer "what makes (the step of interest) ineffective or result in a low output or yield?" When the goal is to uncover desired outcomes related to getting the job done efficiently with no waste, ask the customer "what makes (the step of interest) inefficient, costly, or wasteful?"

In the example of FIG. 11, the flowchart 1100 continues to module 1108 with determining the object of control. To identify the object of control, a sentence that has been searched can be parsed to identify the part of the sentence that begins with the following words and positions it as the object of control. It may be useful to determine if there is a "to" followed by a transitive verb. Specifically, to minimize the time it takes: to determine (decide, conclude, resolve, figure out, assess, establish), to determine (select, choose, pick), to understand (realize), to identify (distinguish, specify), to obtain (acquire, attain), to locate (find, uncover, detect), to gather (collect), to receive (obtain, get), to access (open), to retrieve (recover, reclaim), to verify (confirm, validate, make sure, prove), to respond (reply), to input (put in, record, enter), to provide (supply, give), to translate (convert, transform), to modify (change, revise, convert), to send (transmit, convey, communicate), to submit (propose, present). Some verbs are "suspect" job verbs: to re-execute, to separate (divide, split), to synthesize (combine, blend, integrate), to remove (eliminate, cut off, detach), to disconnect, to restore, to stop (finish, end). To minimize the amount of time . . . /minimize the likelihood of . . . : assuming, receiving, being unaware, not being, formulating, searching, submitting, stopping, continuing, becoming, overlooking, deeming, repeating, getting, following. To minimize the likelihood that . . . : the, a, an, all (the whole, every, the entire), your, you, there.

In the example of FIG. 11, the flowchart 1100 continues to module 1110 with determining the contextual clarifier. It may be desirable to determine whether certain metric-based words do not require a contextual clarifier. Otherwise, to identify the contextual clarifier, the part of the sentence that begins with the following words (prepositions) and positions it as the contextual clarifier is generally the contextual clarifier: to (14%)—to a, to an, to the; in (10.3%); on (9.7%); that (9.5%) (conj) (which); when (6.6%) (conj) if (noun); for (in favor of, on behalf of, in support of, in place of, instead of, used for); with (in combination with, together with, combined with, in conjunction with, in addition to, along with, alongside); about (regarding, vis-à-vis, concerning); after (following, behind); along (all along, down); among (amid, amongst, surrounded by); around (near, toward, close, surrounding); as (in the role of, in the capacity of); as of (from, since); at; before (prior to, ahead of); beside (next to, adjacent, adjoining, against); between; beyond (past, further than); by; despite (in spite of); due to (caused by, because of, as a result of, on account of); during (throughout, through); excluding (except, except for, excepting, not including); facing (in front of, opposite); like (similar to, akin to, resembling); outside; over (above, on top of); rather than (instead of, as opposed to, in place of); under (beneath, below, underneath); until (awaiting, pending); while (whilst, at the same time as) (conj); within (inside); without (not including, with no, devoid of).

In the example of FIG. 11, the flowchart 1100 continues to module 1112 with defining the examples. The defined examples can be implementation- and/or configuration-dependent.

In the example of FIG. 11, the flowchart 1100 continues to module 1114 with determining when to stop. It may be desirable to identify and eliminate duplicates as you go. It may be desirable to delete outcome statements with the same objects of control and contextual clarifiers.

In the example of FIG. 11, the flowchart 1100 ends at module 1116 with placing outcomes in process steps. It may be desirable to locate one of the following words in the statement to facilitate placement of the statement in one of the 8 universal process steps. Choose (select, determine, elect, opt, decide); Locate (find, gather, collect, access retrieve); Prepare (get ready, arrange, organize, set up); Confirm (validate, verify, make sure, certify); Execute (perform, carry out, transact, conduct, do); Monitor (oversee, supervise, watch over, track, check, inspect, examine); Modify (update, adjust, adapt, revise, correct, regulate, tweak, change); Conclude (finish, end, wrap up, stop, close, complete, terminate); Resolve (solve, fix, repair, restore, troubleshoot, resolve, restore). It may be desirable to identify prepositions for prepositional phrases. Job verbs include: Abate, Bring down, Change, Curtail, Cut, Cut down, Chop, Damage, Demote, Decline, Deteriorate, Diminish, Divide, Downgrade, Drive down, Dwindle, Eliminate, Extract, Fail, Fall off, Hack, Negate, Least, Lessen, Lose, Lower, Remove, Separate, Simplify, Subside, Separate, Slash, Segment, Slice, Stop, Shrink, Take away from, Thin out, Undergo, Wane, Weaken. Words that indicate the need to add, increase or improve include: Add to, Amplify, Assist, Augment, Beef up, Bolster, Boost, Brace, Build up, Enlarge, Enhance, Expand, Feed, Firm Up, Fortify, Grow, Harden, Help, Intensify, Make the most of, Make bigger, Magnify, Multiply, Promote, Raise, Reinforce, Stimulate, Strengthen, Support, Toughen.

Figure 12:
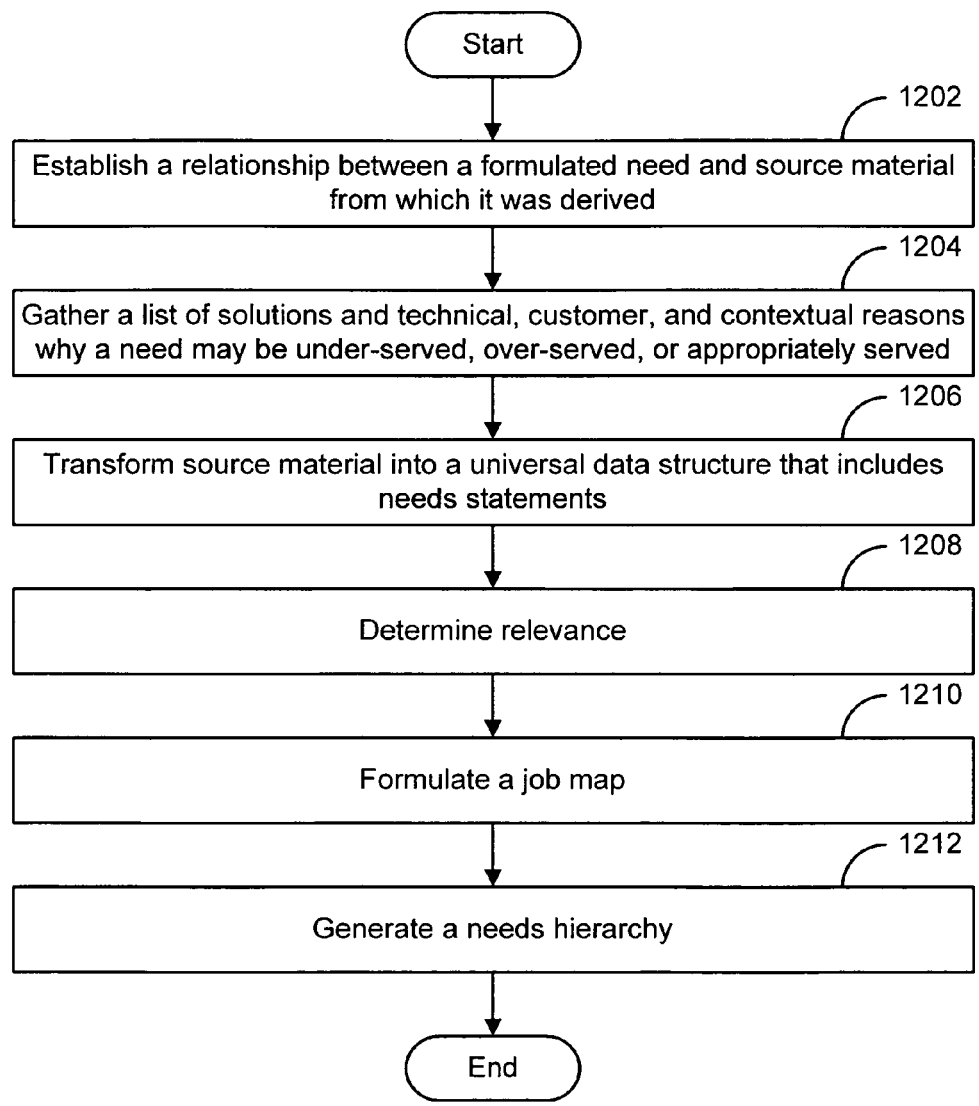
FIG. 12 depicts a flowchart of an example of a method for minimizing the resources to gather and formulate needs in a manner that complies with rules to ensure proper inputs are used in downstream workflows.

FIG. 12 depicts a flowchart 1200 of an example of a method for minimizing the resources to gather and formulate needs in a manner that complies with rules to ensure proper inputs are used in downstream workflows. Resources can include, for example, time, expense, computations, etc. Downstream workflows can include, for example, strategy formulation, marketing, product development, etc.

In the example of FIG. 12, the flowchart 1200 starts at module 1202 with establishing a relationship between a formulated need and source material from which it was derived. This may include, for example, using the need as expressed in the source material to provide improved formulation of the need. It can also enable the use of "verbatims" or "the literal voice of the customer" to provide context and explanation related to the formulated need statement. This context can be useful to an analysis engine or to a human user who considers the formulated need along with the context to determine whether the formulation is proper, accurate, and/or precise in view of the source, or to improve decision-making associated with a properly formulated need.

Establishing a relationship between a formulated need and source material can start with a query formulation engine that gathers data in a manner that facilitates establishing the relationship. Effective use of market tags and rules can reduce the time it takes for, e.g., a company to uncover needs statements.

In the example of FIG. 12, the flowchart 1200 continues to module 1204 with gathering a list of solutions and technical, customer, and contextual reasons why a need may be underserved, over-served, or appropriately served. In addition, existing primary and secondary research from which data necessary to formulate a strategy is needed, including how many people execute a certain job, how frequently they execute it, how satisfied they are with their ability to get that job done, how much money they spend today piecing together solutions to get that job done, how much time they spend getting that job done, how much they are willing to spend to get that job done perfectly, and the longevity of the job—the number of years that job will likely be informed—can be gathered. This information later enables a user to understand causal reasons for how well a need is met—an important input to the strategy formulation process. An ESI gathering engine can use queries to obtain candidate ESI that includes contextual data, such as examples and reasons.

In the example of FIG. 12, the flowchart 1200 continues to module 1206 with transforming source material into a universal data structure that includes needs statements. A needs gathering engine can combine candidate ESI with rules that consider contextual data to gain refinement data and establish needs. Needs statements can be extracted from properly parsed sentences, as long as the system knows what to look for. The needs statements can be stored with additional contextual information if implemented to enable such storage. In this way, source material can be transformed into a useful universal data structure that includes needs statements. Improvement of queries with a query modification engine and using a gap identification engine to improve an interview process can further improve the efficiency of the system.

In the example of FIG. 12, the flowchart 1200 continues to module 1208 with determining relevance. When data is properly transformed into a universal data structure, a determination of relevance can be made with relative ease by comparing data within the data structure with other contextual data. It may also be possible to establish relevance without the use of contextual data if the needs statements are sufficiently informative, or if other needs statements are clearly relevant, as determined by rules.

In the example of FIG. 12, the flowchart 1200 continues to module 1210 with formulating a job map, and ends at module 1212 with using the job map to generate a needs hierarchy.

Engines, as used in this paper, refer to computer-readable media coupled to a processor. The computer-readable media have data, including executable files, that the processor can use to transform the data and create new data.

The detailed description discloses examples and techniques, but it will be appreciated by those skilled in the relevant art that modifications, permutations, and equivalents thereof are within the scope of the teachings. It is therefore intended that the following appended claims include all such modifications, permutations, and equivalents. While certain aspects of the invention are presented below in certain claim forms, the applicant contemplates the various aspects of the invention in any number of claim forms. For example, while only one aspect of the invention is recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to add additional claims after filing the application to pursue such additional claim forms for other aspects of the invention.

What is claimed is:

1. A system comprising:
 a processor; and
 a computer-readable medium coupled to the processor and comprising, for execution by the processor:
 a query formulation engine for generating electronically stored information (ESI) queries;
 an ESI engine, coupled to the query formulation engine, for generating candidate ESI;
 a needs gathering engine, coupled to the ESI engine, for storing needs;
 a job map formulation engine;
 a needs generation engine, coupled to the job map formulation engine, for generating a needs hierarchy;
 wherein, in operation:
 the query formulation engine uses rules to generate market tags and uses the market tags to generate the ESI queries, and provides the ESI queries to the ESI engine, the market tags representing a market including a demographic and a job that the demographic is trying to accomplish;
 the ESI engine uses feedback, a search/content data store, and the ESI queries to identify candidate ESI;
 the needs gathering engine uses rules and the candidate ESI to store needs;
 the job map formulation engine uses the needs to generate a job map;
 the needs generation engine uses the needs, the job map, and rules to generate a needs hierarchy, wherein the needs hierarchy can be used in downstream workflows.

2. The system of claim 1, wherein the needs gathering engine generates refinement data, further comprising:
 a query modification engine, coupled to the needs gathering engine, for using rules and the refinement data to generate the feedback.

3. The system of claim 1, further comprising a gap identification engine for using identified gaps to generate the feedback.

4. The system of claim 1, further comprising a relevance determination engine, coupled to the job map formulation engine, for using the market tags for relevance-based refinement of the needs.

5. A method comprising:
 formulating, by a processor, market tags and electronically stored information (ESI) queries based on the market tags, the market tags representing a market including a demographic and a job that the demographic is trying to accomplish;
 using the ESI queries to gather candidate ESI;
 using rules to transform the candidate ESI into universal data structures that include needs statements;
 determining relevance of the needs statements using the market tags;
 organizing the universal data structures in accordance with relevance of the needs statements;

formulating a job map from the needs statements, as organized for relevance;
generating a needs hierarchy from the job map, rules, and the needs statements, as organized for relevance;
using the needs hierarchy in downstream workflows.

6. The method of claim 5, further comprising selecting a market.

7. The method of claim 5, further comprising:
modifying the ESI queries using refinement data associated with processing the candidate ESI;
providing feedback for further ESI gathering using the refinement data and rules.

8. The method of claim 5, further comprising:
identifying gaps in the needs statements of the universal data structures;
providing feedback for further ESI gathering using the identified gaps.

9. The method of claim 5, further comprising:
tagging market definitions;
storing the market tags.

10. The method of claim 5, further comprising:
deduplicating the ESI queries;
storing the ESI queries.

11. The method of claim 5, further comprising:
selecting one or more search engines or content repositories;
sending the ESI queries to the one or more search engines;
receiving replies from the search engines;
retrieving ESI from the replies;
transforming the ESI into universal data structure format;
deduplicating the ESI;
storing the ESI.

12. The method of claim 11, further comprising translating the ESI queries for a subset of the search engines.

13. The method of claim 5, further comprising:
tagging a document;
identifying verb-object clauses;
parsing the clauses;
identifying relationships between the clauses;
recognizing clause types for each of the clauses;
extracting needs statements from the clauses;
applying netting rules;
storing the needs statements in the universal data structures.

14. The method of claim 5, further comprising:
determining relevance of the ESI to a target model;
storing a measure of relevance;
prioritizing the ESI by relevance;
purging irrelevant ESI and associated needs statements;
deduplicating needs statements.

15. The method of claim 5, further comprising:
formulating queries to uncover the job map;
sending the queries to a needs data store;
receiving replies from the needs data store;
formulating candidate job maps;
storing the candidate job maps;
receiving a candidate job map selection;
storing the selected job map.

16. The method of claim 5, wherein the needs hierarchy is a final needs hierarchy, further comprising:
formulating queries to uncover the needs hierarchy;
sending queries to a needs data store;
receiving replies from the needs data store;
populating the needs hierarchy;
storing the populated needs hierarchy;
identifying gaps in the populated needs hierarchy;
determining the final needs hierarchy;
storing the final needs hierarchy.

17. A method comprising:
deriving, by a processor, a formulated need from source material, the source material obtained through an electronically stored information (ESI) query generated from a market tag, the market tag representing a market including a demographic and a job that the demographic is trying to accomplish;
establishing a relationship between the formulated need and the source material from which the need was derived;
transforming the source material into a universal data structure that includes a needs statement associated with the formulated need;
formulating a job map using the needs statement;
generating a needs hierarchy using the job map and rules;
using the needs hierarchy in a downstream workflow.

18. The method of claim 17, further comprising gathering technical, customer, and contextual reasons why the formulated need may be under-served, over-served, or appropriately served.

19. The method of claim 17, further comprising gathering a list of solutions for the formulated need.

20. The method of claim 17, further comprising determining relevance of the formulated need.

* * * * *